United States Patent
Stark et al.

(10) Patent No.: US 9,692,951 B2
(45) Date of Patent: *Jun. 27, 2017

(54) SPRING-LOADED MOUNTING HOUSING FOR A CAMERA

(71) Applicant: Avigilon Corporation, Vancouver (CA)

(72) Inventors: Andrew J. Stark, Vancouver (CA); Sudeep Mohan, Vancouver (CA); Yat Shun Damien Yu, Vancouver (CA)

(73) Assignee: AVIGILON CORPORATION, Vancouver (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/238,571

(22) Filed: Aug. 16, 2016

(65) Prior Publication Data
US 2016/0360076 A1 Dec. 8, 2016

Related U.S. Application Data

(63) Continuation of application No. 14/696,208, filed on Apr. 24, 2015, now Pat. No. 9,451,133.
(Continued)

(51) Int. Cl.
*H04N 5/225* (2006.01)
*F16M 13/02* (2006.01)
*G03B 17/56* (2006.01)

(52) U.S. Cl.
CPC .......... *H04N 5/2252* (2013.01); *F16M 13/02* (2013.01); *F16M 13/022* (2013.01); *G03B 17/561* (2013.01); *H04N 5/2253* (2013.01)

(58) Field of Classification Search
CPC .... H04N 5/2252; H04N 5/2253; H04N 5/225; H04N 5/2251; G03B 17/56; F16M 1/02; F16M 13/022
See application file for complete search history.

(56) References Cited

U.S. PATENT DOCUMENTS 4,833,534 A   5/1989   Paff et al.
5,223,872 A   6/1993   Stiepel et al.
(Continued)

OTHER PUBLICATIONS

"Recess Mount Installation" Arrecont Vision; Installation Manual; 13 pages; No Authors.
(Continued)

*Primary Examiner* — Tuan Ho
(74) *Attorney, Agent, or Firm* — Baker & Hostetler LLP

(57) ABSTRACT

A mounting housing for a camera includes a surface contacting member and a sliding member that is slidable within an interior conduit within the surface contacting member. The surface contacting member has a back end that is located behind a mounting surface when the mounting housing is mounted and a front end, connected to the back end, that is located in front of the mounting surface when the mounting housing is mounted. A spring is pivotably coupled to and extends outwardly from the back end, and the spring is pivotable to apply force on to a back side of the mounting surface when the mounting housing is mounted. The sliding member is slidable along the interior conduit between mounted and un-mounted positions. The sliding member is lockable in the mounted position to bias the spring against the mounting surface when the mounting housing is mounted.

17 Claims, 46 Drawing Sheets

Related U.S. Application Data

(60) Provisional application No. 61/983,991, filed on Apr. 24, 2014.

(56) References Cited

U.S. PATENT DOCUMENTS

| | | |
|---|---|---|
| 5,852,754 A | 12/1998 | Schneider |
| 5,941,625 A | 8/1999 | Morand |
| 6,268,882 B1 | 7/2001 | Elberbaum |
| 6,476,856 B1 | 11/2002 | Zantos |
| 6,896,423 B2 | 5/2005 | Arbuckle et al. |
| 6,992,723 B1 | 1/2006 | Wulf et al. |
| 7,011,460 B1 | 3/2006 | Todd et al. |
| 7,217,045 B2 | 5/2007 | Jones |
| 7,306,383 B2 | 12/2007 | Jones et al. |
| 7,387,453 B2 | 6/2008 | Arbuckle |
| 7,549,808 B2 | 6/2009 | Sakigawara et al. |
| 7,614,804 B2 | 11/2009 | Kim |
| 7,621,680 B2 | 11/2009 | Frick et al. |
| 7,777,810 B2 | 8/2010 | Kung et al. |
| 7,841,782 B2 | 11/2010 | Tatewaki |
| 7,946,772 B2 | 5/2011 | Yu |
| D668,701 S | 10/2012 | Ohno et al. |
| 8,382,386 B2 | 2/2013 | Cheng et al. |
| 8,525,880 B2 | 9/2013 | DiPoala |
| 8,558,945 B2 | 10/2013 | Yamauchi et al. |
| 2007/0126872 A1 | 6/2007 | Bolotine et al. |
| 2008/0055409 A1 | 3/2008 | Mars et al. |
| 2012/0056057 A1* | 3/2012 | Huang .................. F16M 11/12 248/288.11 |
| 2012/0120239 A1 | 5/2012 | Hutzel et al. |
| 2013/0147963 A1 | 6/2013 | Henninger et al. |
| 2014/0023357 A1 | 1/2014 | Wong et al. |
| 2014/0267715 A1 | 9/2014 | Kemege et al. |
| 2016/0037663 A1* | 2/2016 | Lau ....................... F16M 13/02 248/277.1 |

OTHER PUBLICATIONS

"Avigilon High Definition IP Dome Camera Indoor In-Ceiling Mount"; Avigilon; Installation Guide; Sep. 26, 2011; 31 pages; No Authors.

"18x/28x/36x WDR PTZ Dome Camera"; Dahua Technology Co. Ltd.; DH-SD6563E/65E/66E-H Specifications; 2013; 5 pages; No Authors.

"AXIS P12 Network Camera Series: Miniature HDTV cameras for exceptionally discreet surveillance"; AXIS Communications; 2013; 2 pages; No Authors.

"FlexMount S14"; Mobotix; Specification; 3 pages; No Authors.

International Patent Application No. PCT/US2015/27665; Int'l Search Report and the Written Opinion; dated Aug. 4, 2015; 15 pages.

International Patent Application No. PCT/US2015/027665; Int'l Preliminary Report on Patentability; dated Nov. 3, 2016; 7 pages.

* cited by examiner

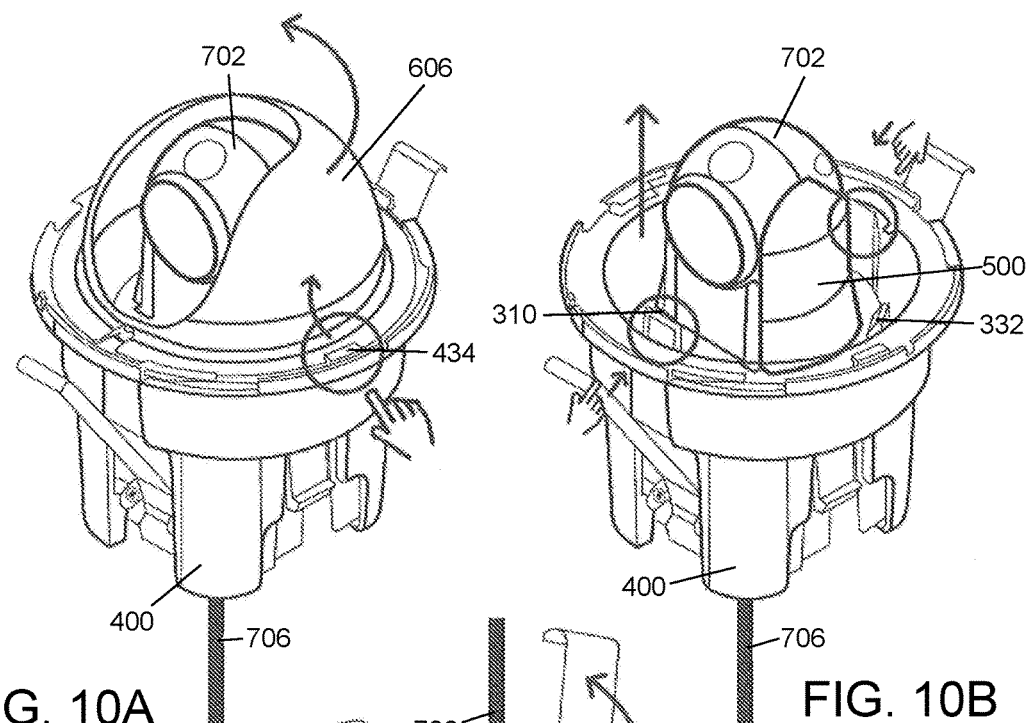
FIG. 10A
FIG. 10B
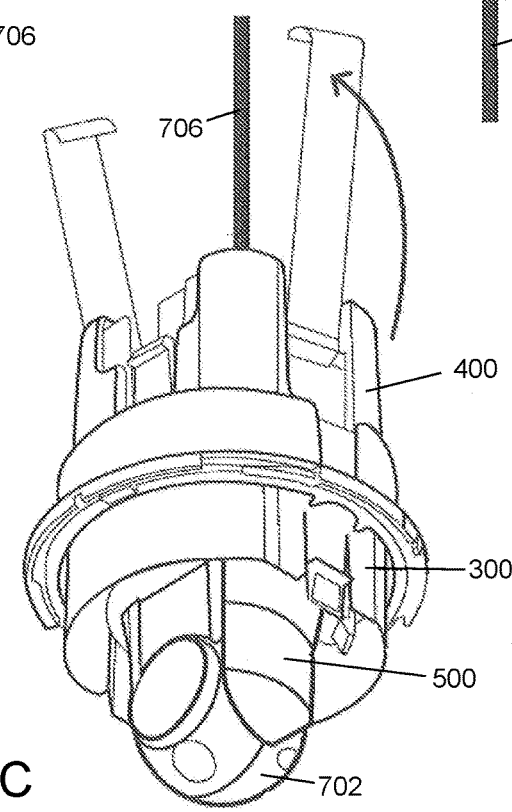
FIG. 10C

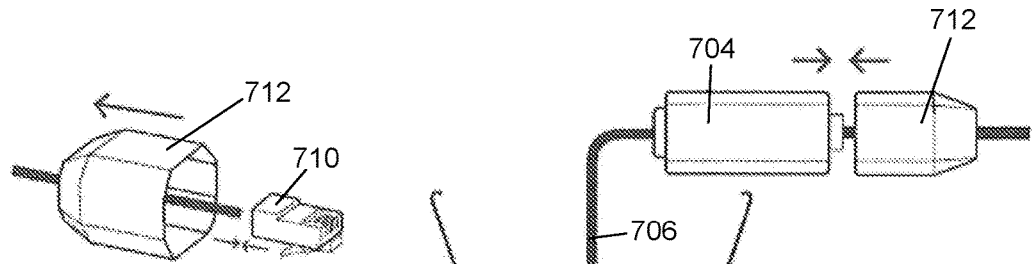
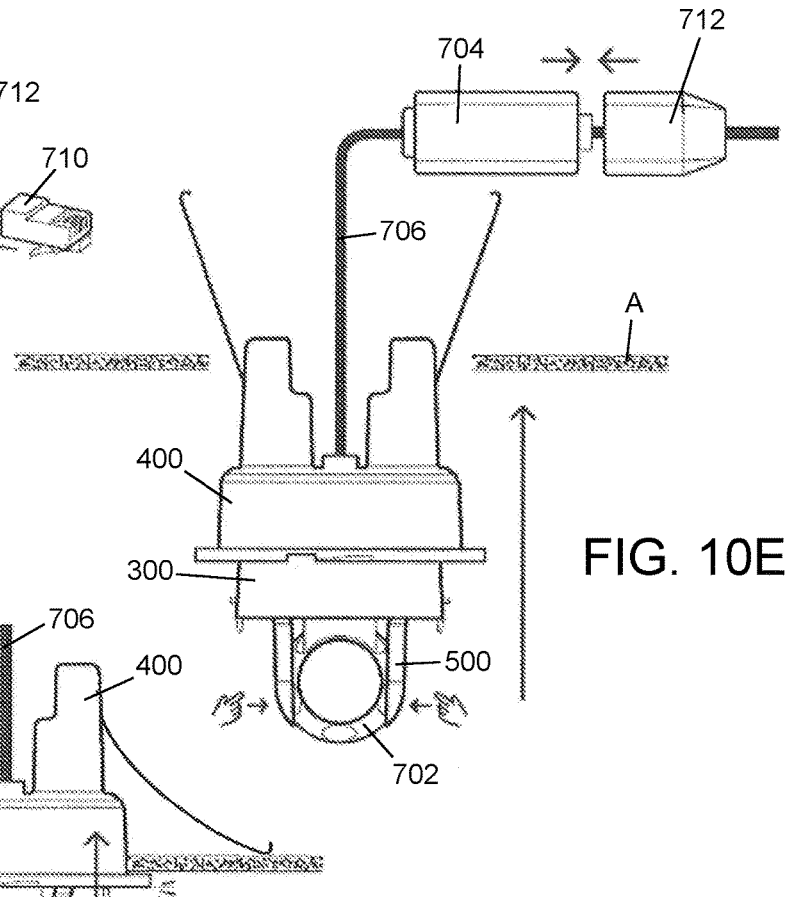
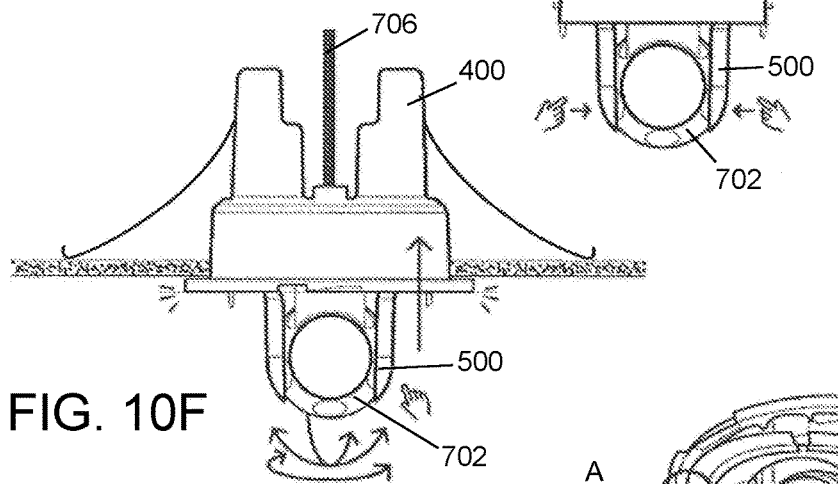
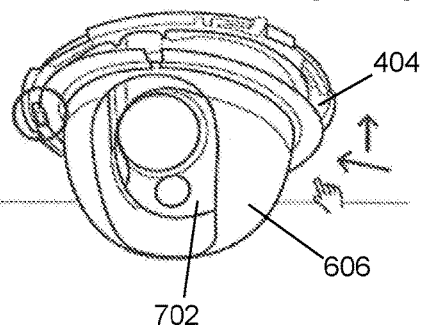
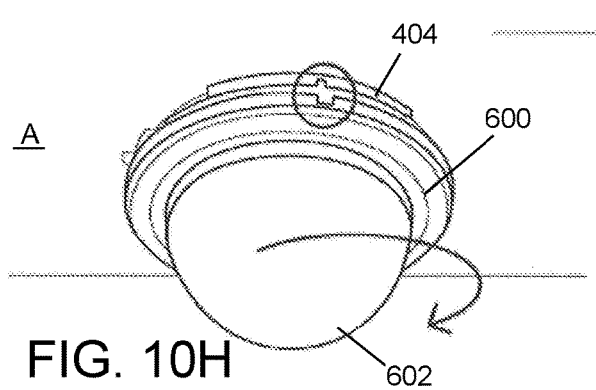
FIG. 10D
FIG. 10E
FIG. 10F
FIG. 10G
FIG. 10H

SPRING-LOADED MOUNTING HOUSING FOR A CAMERA

CROSS REFERENCE TO RELATED APPLICATIONS

This application is a continuation of U.S. patent application Ser. No. 14/696,208, filed Apr. 24, 2015, which claims benefit under 35 U.S.C. §119(e) of Provisional U.S. Patent Application No. 61/983,991, filed Apr. 24, 2014, the contents of each of which are incorporated herein by reference in their entirety.

TECHNICAL FIELD

The present disclosure is directed at a mounting housing for a camera such as a security camera, a camera assembly comprising a camera and a mounting housing, and a method for mounting a camera assembly comprising a camera attached to a mounting housing.

BACKGROUND

The global video surveillance market remains strong given the actual and perceived needs for surveillance in response to problems such as violent crime, property crime, and terrorism. In particular, a significant amount of activity in the global surveillance market relates to replacing analog security cameras with newer and more flexible digital surveillance cameras. Given this, there exists a continued need for solutions that can expedite and ease installation of surveillance equipment generally and security cameras in particular.

SUMMARY

According to a first aspect, there is provided a mounting housing for a camera. The mounting housing comprises a surface contacting member and a sliding member. The surface contacting member comprises a back end located behind a mounting surface when the mounting housing is mounted, with the back end comprising an interior conduit extending along the back end; a front end connected to the back end and located in front of the mounting surface when the mounting housing is mounted; and a spring pivotably coupled to and extending outwardly from the back end, the spring pivotable to apply force on to a back side of the mounting surface when the mounting housing is mounted. The sliding member is slidable along the interior conduit between mounted and un-mounted positions with at least a portion of the sliding member extending out of the back end when in the un-mounted position. The sliding member is lockable in the mounted position to bias the spring to apply force on to the back side of the mounting surface when the mounting housing is mounted.

The interior conduit may delineated by a wall having a slot. The spring may comprise two ends. The spring may be pivotably coupled to the back end between its two ends.

The spring may be a flat spring, and the flat spring may apply force on to the back side of the mounting surface by directly contacting the back side of the mounting surface.

The spring may be pivotably coupled to edges of the slot.

The mounting housing may further comprise a first latch for locking the sliding member in the mounted position, the first latch comprising a first lever arm and a first hook on one of the sliding member and surface contacting member; and a first slot shaped and positioned to receive the first hook when the sliding member is in the mounted position, with the first slot on the other of the sliding member and surface contacting member.

More of the sliding member may be contained within the interior conduit when the sliding member is in the mounted position than in the un-mounted position.

The mounting housing may further comprise a second latch for preventing the sliding member from sliding further out of the interior conduit when in the un-mounted position, the second latch comprising a second lever arm and a second hook on one of the sliding member and surface contacting member; and a second slot shaped and positioned to receive the second hook when the sliding member is in the un-mounted position, with the second slot on the other of the sliding member and surface contacting member.

The mounting housing may further comprise a gimbal mounted to an underside of the sliding member for retaining a camera head, the gimbal comprising at least two arms positioned to frictionally retain the camera head therebetween, with each of the arms has a linearly extending side positioned to contact the camera head; and a seat positioned to receive a surface of the camera head.

The gimbal may further comprise a top surface from which the arms and the seat extend, with the top surface comprising a slot for receiving a cable that connects the spherical camera to image processing circuitry.

The seat may be curved.

The gimbal may further comprise a lip extending from the top surface on a side opposite from which the arms and the seat extend. The lip may be spaced from the periphery of the top surface to delineate a flange between the lip and the periphery of the top surface. The sliding member may further comprise gimbal latches extending from an underside of the sliding member, with each of the gimbal latches comprising a lever arm at an end of which is a hook, and with the gimbal latches being hooked over the flange of the gimbal to secure the gimbal to the sliding member.

The back end may comprise a cylindrical portion having a top surface; and a rounded polygonal portion extending outwardly from the top surface of the cylindrical portion, with the interior conduit extending through the top surface and along the interior thereof. The front end may comprise a flange circumscribing a bottom edge of the cylindrical portion.

The surface contacting member's rounded polygonal portion may be shaped as a rounded rectangle.

The sliding member may comprise a base portion having a top surface; and a rounded polygonal portion extending outwardly from the top surface of the base portion and having channels in opposing sides thereof, with at least one of the channels biasing the spring against the back side of the mounting surface when the sliding member is in the mounted position and the mounting housing is mounted.

The sliding member's rounded polygonal portion may be shaped as a rounded rectangle.

The rounded polygonal portions of the sliding and surface contacting members may be hollow and large enough to permit the processing module to pass therethrough, and each of the top surfaces of the base and cylindrical portions may have an opening, permitting access to the interior conduit, large enough to permit the processing module to pass therethrough.

According to another aspect, there is provided a camera assembly. The camera assembly comprises a camera and a mounting housing for the camera. The camera may comprise a camera head comprising at least one of each of a lens and image sensor; a processing module comprising image processing circuitry and power circuitry; and a cable connecting the camera head and processing module. The mounting housing comprises a surface contacting member, a sliding member, and a gimbal mounted to an underside of the sliding member for retaining the camera head. The surface contacting member comprises a back end including an interior conduit extending along the back end, a front end connected to the back end, and a spring pivotably coupled to and extending outwardly from the back end, wherein the spring is pivotable to apply force on to a back side of a mounting surface when the mounting housing is mounted. The sliding member is slidable along the interior conduit between mounted and un-mounted positions, and the sliding member is lockable in the mounted position to bias the spring to apply force on to the back side of the mounting surface when the mounting housing is mounted.

According to a third aspect, there is provided a method for mounting a camera assembly comprising a camera attached to a mounting housing. The method comprises, prior to inserting a back end of the mounting housing behind a mounting surface: (i) creating a hole into the mounting surface sized to accept the back end but not a front end of the mounting housing that is connected to the back end, in which a spring that is pivotably coupled to and that extends outwardly from the back end is pivotable to apply force on to a back side of the mounting surface when the mounting housing is mounted; and (ii) moving a sliding member that comprises part of the mounting housing to an un-mounted position, in which moving the sliding member comprises sliding, along an interior conduit within the back end, at least a portion of the sliding member out of the back end. The method further comprises placing the back end of the mounting housing behind the mounting surface; pressing the front end of the mounting housing against a front side of the mounting surface while the back end of the mounting housing is behind the mounting surface; and moving the sliding member into the mounted position by sliding the sliding member into the back end along the interior conduit, with the sliding member biasing the spring to apply force against the mounting surface when in the mounted position.

The interior conduit may be delineated by a wall having a slot. The spring may comprise two ends. The spring may be pivotably coupled to the back end between its two ends.

The spring may be a flat spring. The flat spring may apply force on to the back side of the mounting surface by directly contacting the back side of the mounting surface.

The spring may be pivotably coupled to edges of the slot.

The back and front ends may comprise part of a surface contacting member, and the mounting housing may further comprise a first latch for locking the sliding member in the mounted position, with the first latch comprising a first lever arm and a first hook on one of the sliding member and surface contacting member; and a first slot shaped and positioned to receive the first hook when the sliding member is in the mounted position, the first slot being on the other of the sliding member and surface contacting member.

The mounting housing may further comprise a second latch for preventing the sliding member from sliding further out of the interior conduit when in the un-mounted position, with the second latch comprising a second lever arm and a second hook on one of the sliding member and surface contacting member; and a second slot shaped and positioned to receive the second hook when the sliding member is in the un-mounted position, the second slot being on the other of the sliding member and surface contacting member.

The method may further comprise mounting a gimbal for retaining a camera head to an underside of the sliding member, with the gimbal comprising at least two arms positioned to frictionally retain the camera head therebetween, with each of the arms having a linearly extending side positioned to contact the camera head; and a seat positioned to receive a surface of the camera head.

The gimbal may further comprise a top surface from which the arms and the seat extend, with the top surface comprising a slot for receiving a cable that connects the camera head to image processing circuitry.

The gimbal may further comprise a lip extending from the top surface on a side opposite from which the arms and the seat extend, with the lip being spaced from the periphery of the top surface to delineate a flange between the lip and the periphery of the top surface. The sliding member may further comprise gimbal latches extending from an underside of the sliding member, with each of the gimbal latches comprising a lever arm at an end of which is a hook, and in which the gimbal latches are hooked over the flange of the gimbal to secure the gimbal to the sliding member.

The camera head may be spherical and the seat may be curved.

The camera head may comprise a lens and image sensor, with the camera head comprising part of a camera that further comprises a processing module comprising image processing circuitry and power circuitry, and a cable connecting the camera head and processing module. The method may further comprise mounting the camera head to the gimbal; and passing the processing module from the front end and out the back end of the mounting housing through the interior conduit.

According to another aspect, there is provided a gimbal for retaining a camera head, the gimbal comprising at least two arms positioned to frictionally retain the camera head therebetween, with each of the arms having a linearly extending side positioned to contact the camera head; and a seat having a surface positioned to receive a surface of the camera head.

The camera head may be spherical and the seat may be curved.

The gimbal may further comprise a top surface from which the arms and the seat extend, with the top surface comprising a slot for receiving a cable.

Each of the arms for contacting the camera head may comprise a ridge facilitate holding of the camera head.

The gimbal may further comprise a lip extending from the top surface on a side opposite from which the arms and the seat extend, with the lip spaced from the periphery of the top surface to delineate a flange between the lip and the periphery of the top surface.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

In the accompanying drawings, which illustrate one or more example embodiments:

FIGS. 10A, 10B, 10C, 10D, 10E 10F, 10G and 10H depict a method for mounting a camera using the mounting housing of FIGS. 1A and 1B, according to another embodiment.

DETAILED DESCRIPTION

Figure 1A:
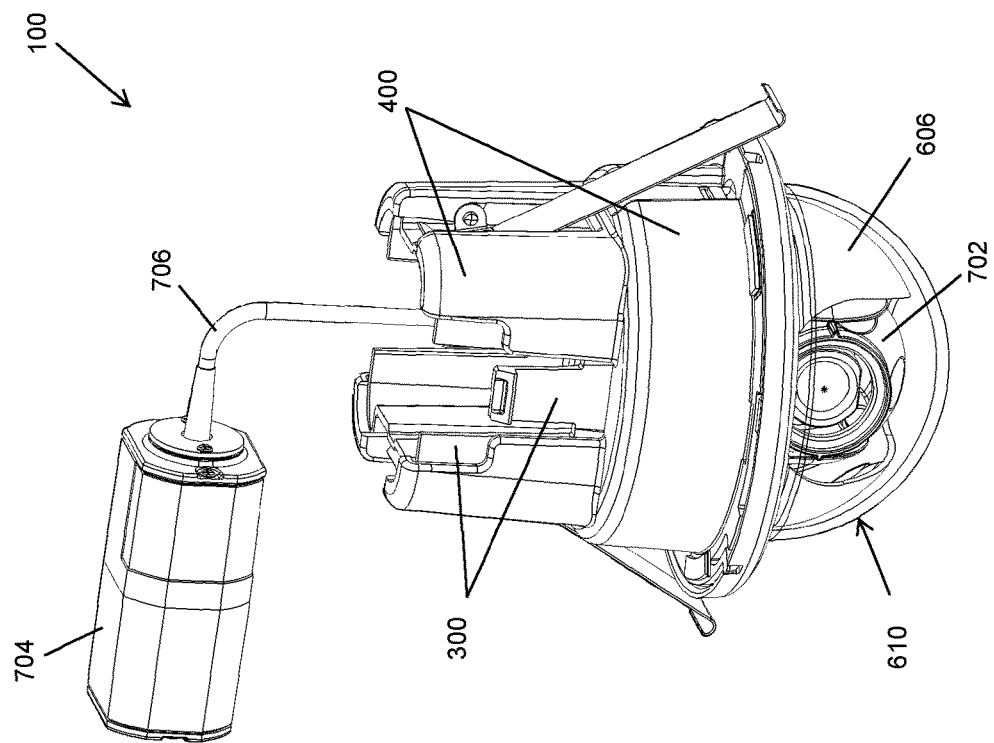
FIGS. 1A and 1B show front and rear perspective views, respectively, of a camera assembly comprising a spring-loaded mounting housing and a spherical camera, according to one embodiment.

Directional terms such as "top," "bottom," "upwards," "downwards," "vertically," and "laterally" are used in the following description for the purpose of providing relative reference only, and are not intended to suggest any limitations on how any article is to be positioned during use, or to be mounted in an assembly or relative to an environment. Additionally, the term "couple" and variants of it such as "coupled", "couples", and "coupling" as used in this description are intended to include indirect and direct connections unless otherwise indicated. For example, if a first device is coupled to a second device, that coupling may be through a direct connection or through an indirect connection via other devices and connections. Similarly, if the first device is communicatively coupled to the second device, communication may be through a direct connection or through an indirect connection via other devices and connections.

A mounting housing refers to a housing that can be used to mount a device to a surface, such as a wall or ceiling. For example, a mounting housing may be combined with a camera to make an in-ceiling mount camera, which is a camera that is designed to be mounted to and partially recessed behind a ceiling. A suitable ceiling is one in which a hollow cavity is behind the ceiling and is sufficiently large to accept back ends of the camera and the mounting housing, which are hidden from view when the camera is mounted, and any associated wiring; suitable ceilings may comprise, for example, drywall screwed on to joists and a suspended or "dropped" ceiling. In the case of a dome camera for example, the bulk of the camera is recessed behind the ceiling and only the hemispherical dome is visible below the ceiling. The portion of the camera that is above the bottom surface of the ceiling when the camera is mounted is the "back end" of the camera, while the volume of space above the bottom surface of the ceiling is the "ceiling space". A hole is cut in the ceiling that is slightly larger than required to allow the back end of the camera to be inserted through it. The camera is equipped with a mechanism to grip the ceiling and hold the camera securely in place.

Generally, these gripping mechanisms are difficult to operate because they are hidden from an installer's view behind the ceiling. They typically use a leadscrew-driven clamp that the installer screws to clamp the camera to the ceiling in order to accommodate a wide range of ceiling thicknesses. Consequently, for thin ceilings the installer may have to awkwardly screw the clamp for a long period of time. This is cumbersome and time consuming for the installer, particularly since the installer is usually standing on a ladder while using one hand to support the camera while screwing the leadscrew.

In contrast, the depicted embodiments are directed at a slidable, spring-loaded mounting housing for a camera such as a security camera, a camera assembly comprising the camera and the mounting housing, and a method for mounting the camera assembly. The mounting housing comprises a sliding member that is slidable within a mounting surface contacting member (hereinafter simply a "surface contacting member"). The sliding member is slidable between mounted and un-mounted positions, and is lockable when in the mounted position to secure the camera assembly to any suitable mounting surface. Examples of suitable mounting surfaces include a planar surface, such as a wall or a ceiling, with sufficient volume behind the planar surface to accommodate the back ends of the surface contacting member and the camera, and any associated wiring. When used to secure the camera assembly to the mounting surface the mounting housing's springs are biased against the mounting surface, thereby securing the mounting housing in place; this use of springs permits the mounting housing to be mounted to surfaces having a wide range of thicknesses. As discussed in greater detail below, and in the example embodiment in which the mounting surface is a ceiling, the installer may adjust the sliding member's position and lock it in the mounted position while standing beneath the ceiling and without using any tools, which facilitates ease of installation.

The embodiments depicted in FIGS. 2A-10H are discussed below. In these embodiments, the example mounting surface is a ceiling. However, as discussed above, in alternative embodiments (not depicted) the mounting surface may be another surface, such as a wall.

Figure 1B:
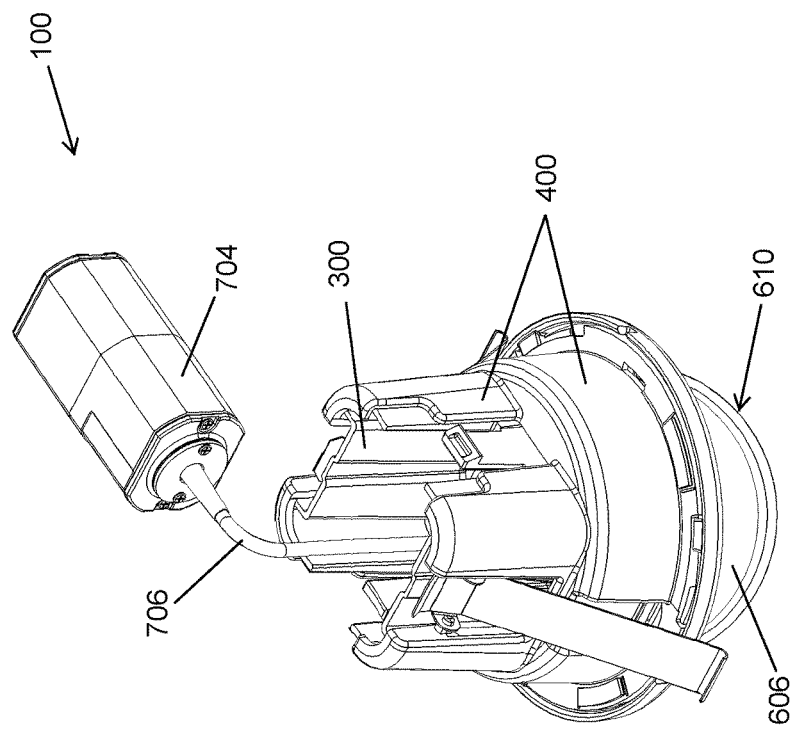
Figure 2A:
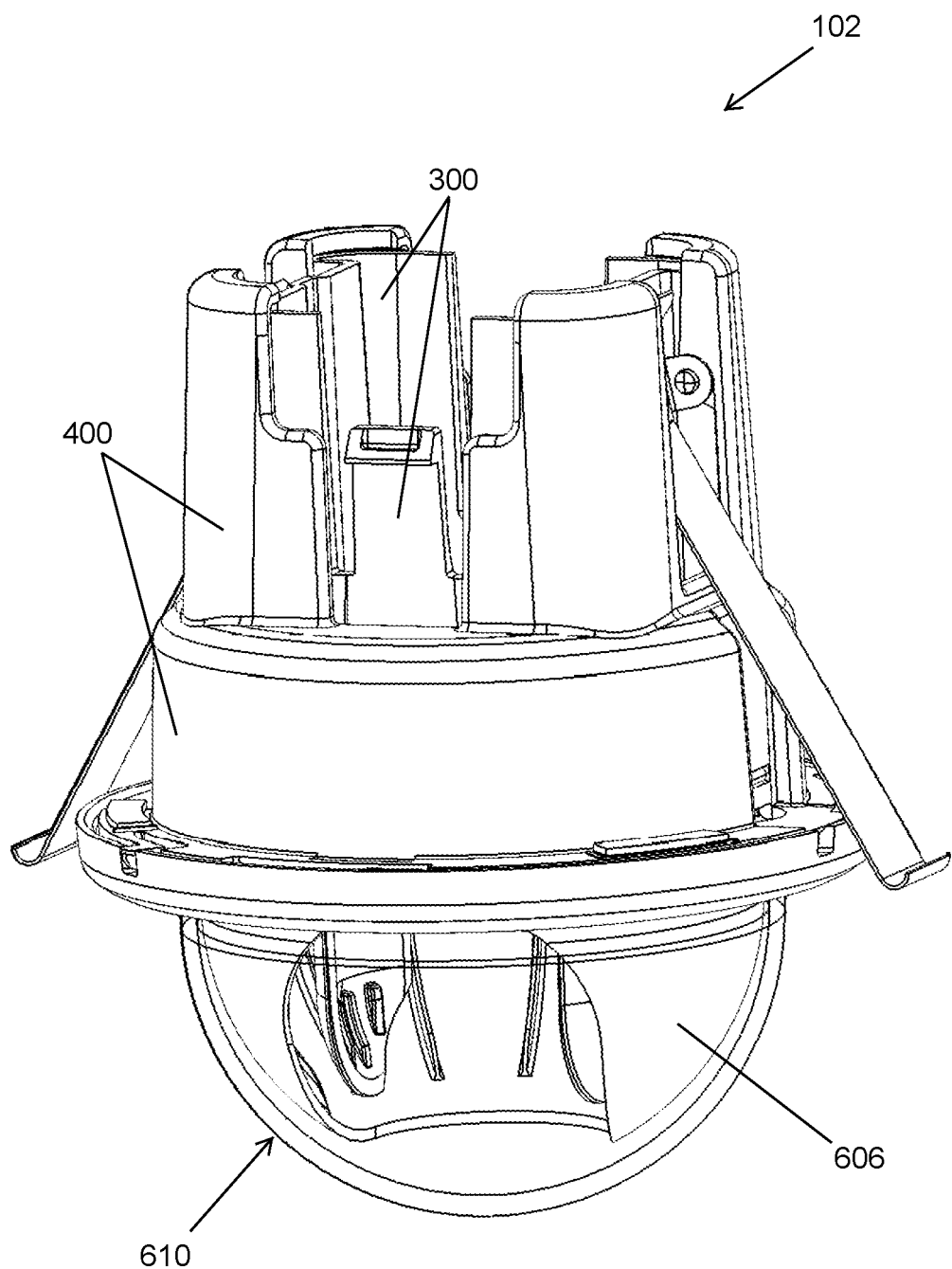
FIGS. 2A, 2B, 2C, 2D, 2E, 2F, 2G and 2H show front perspective, rear perspective, right side elevation, rear elevation, left side elevation, front elevation, top plan, and bottom plan views, respectively, of the mounting housing of FIGS. 1A and 1B.
Figure 2B:
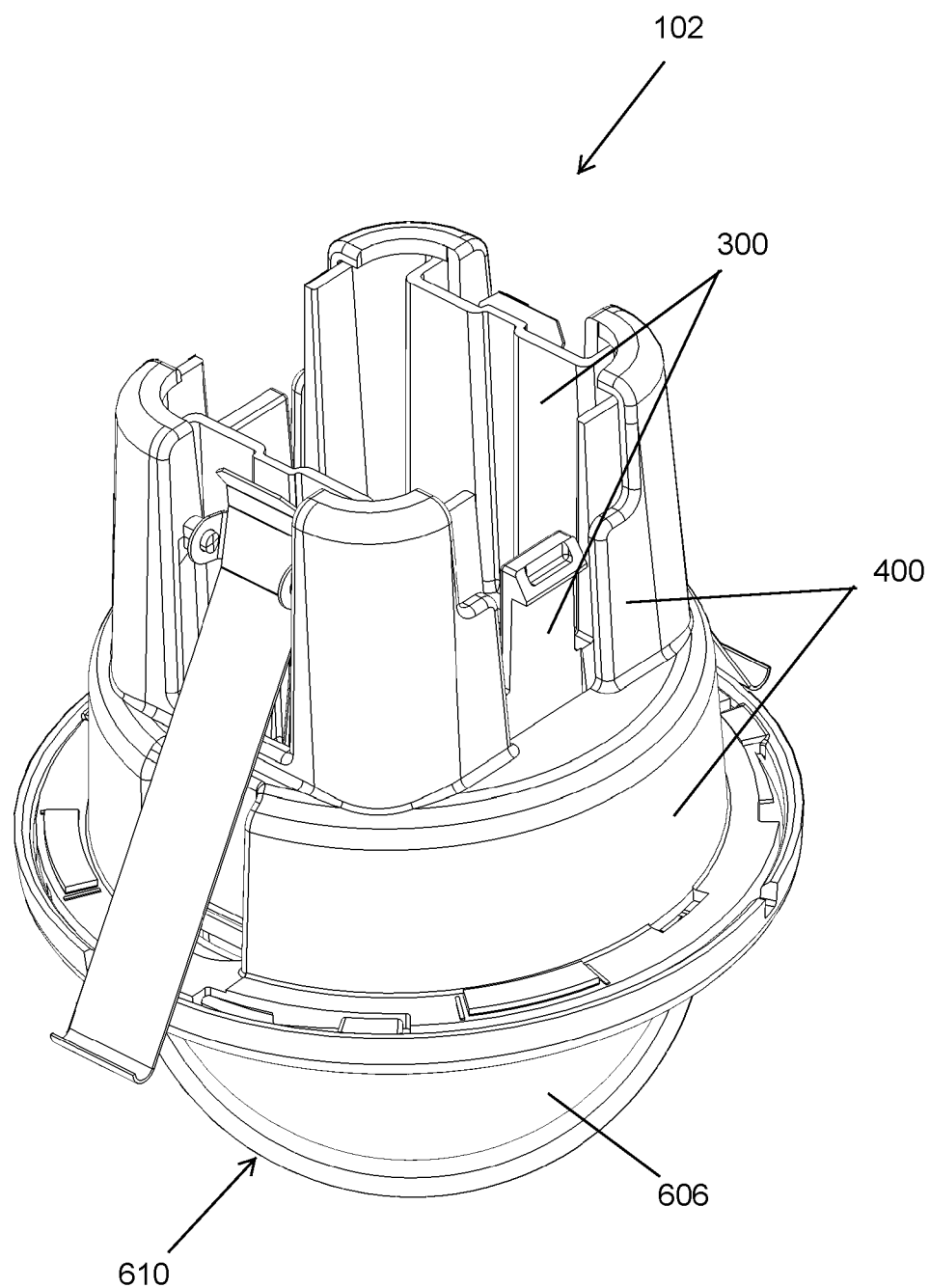
Figure 2C:
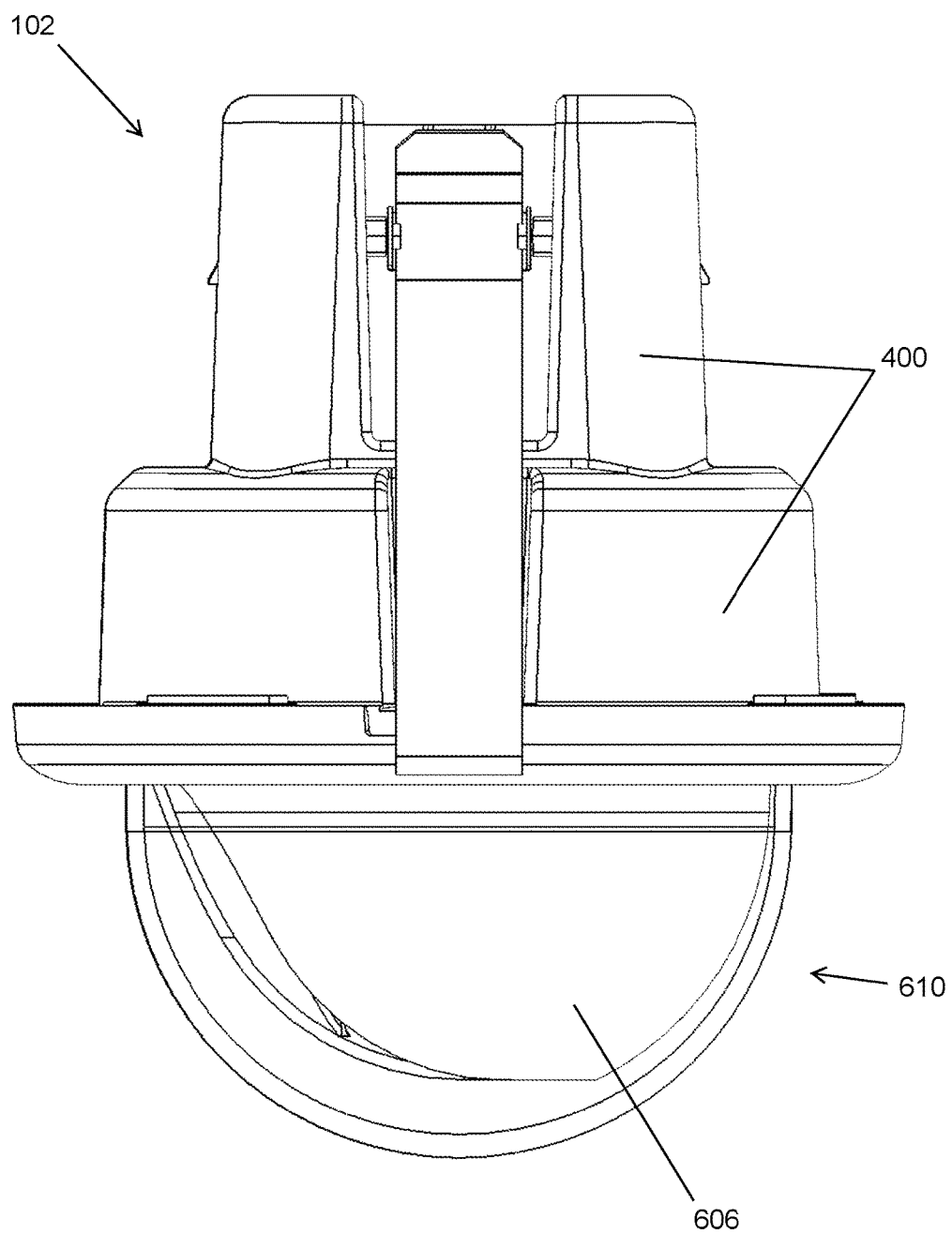
Figure 2D:
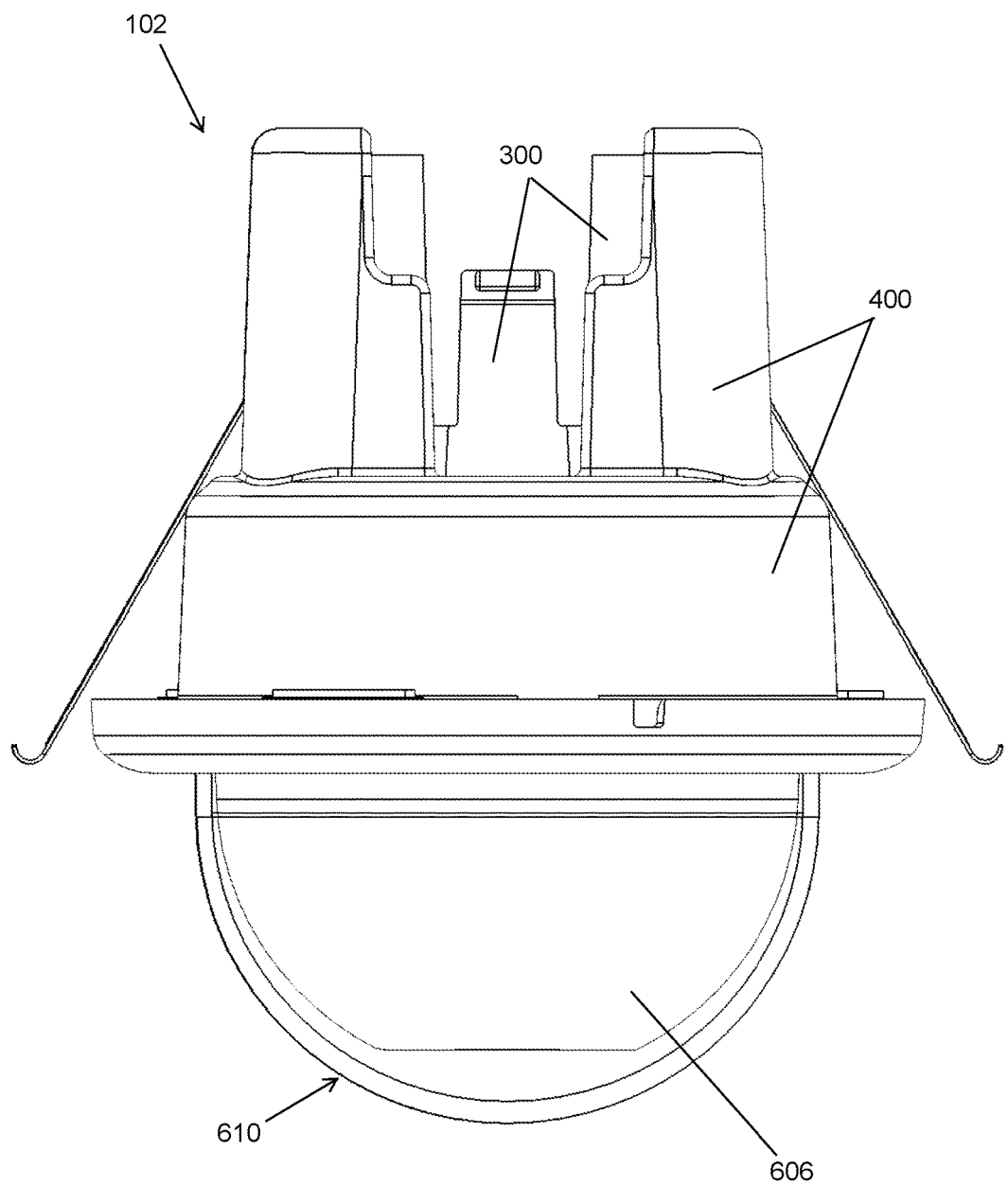
Figure 2E:
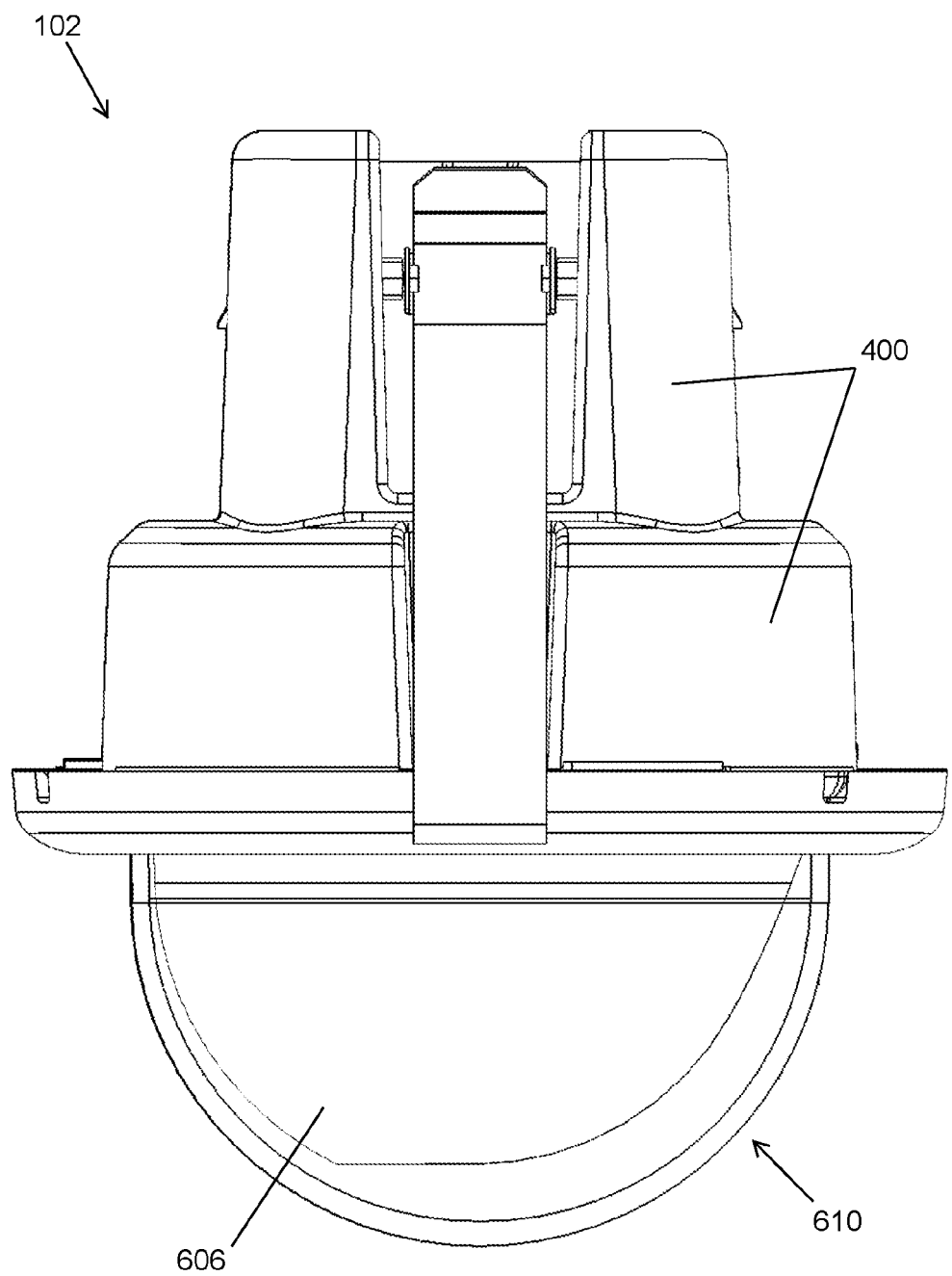
Figure 2F:
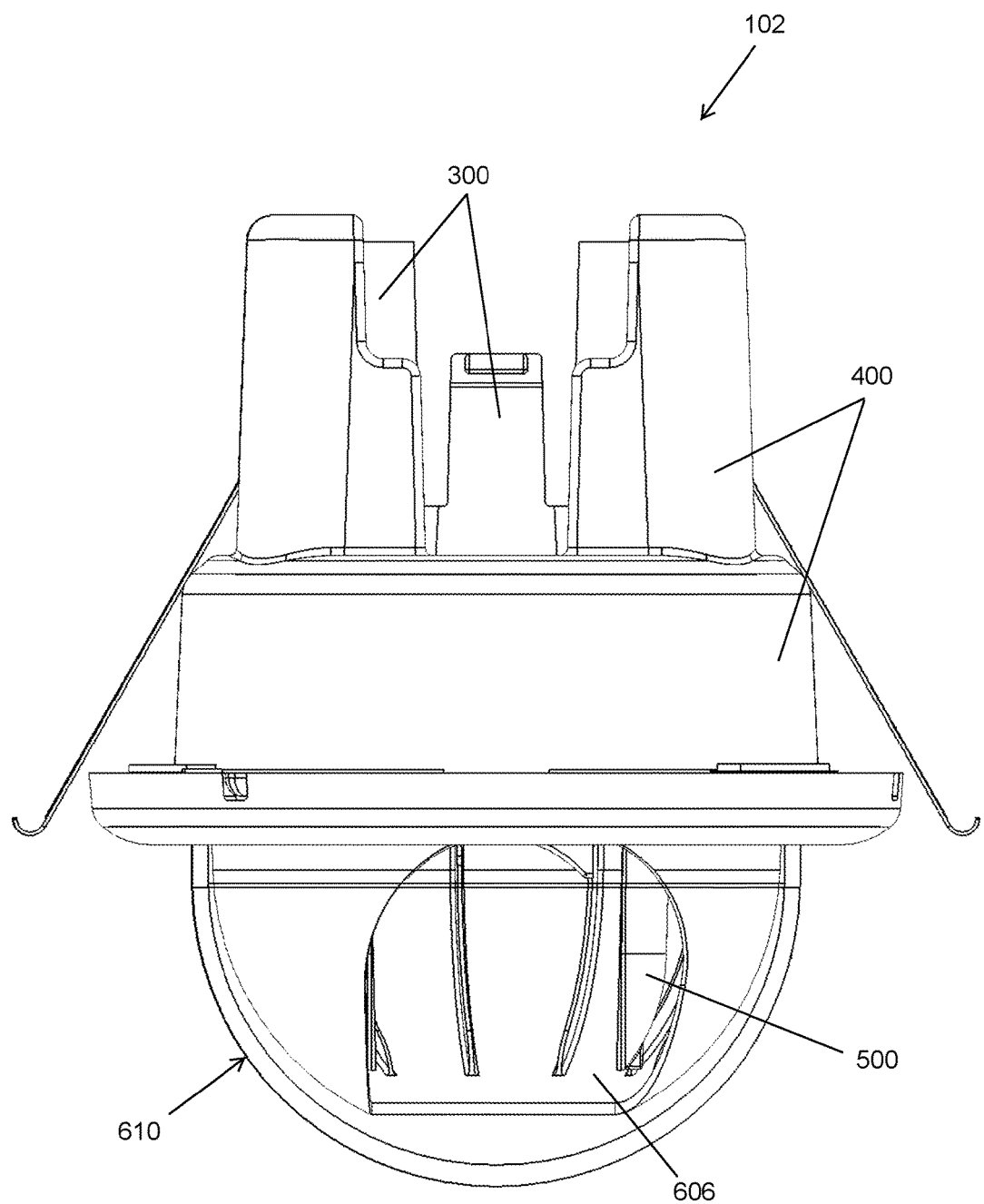
Figure 2G:
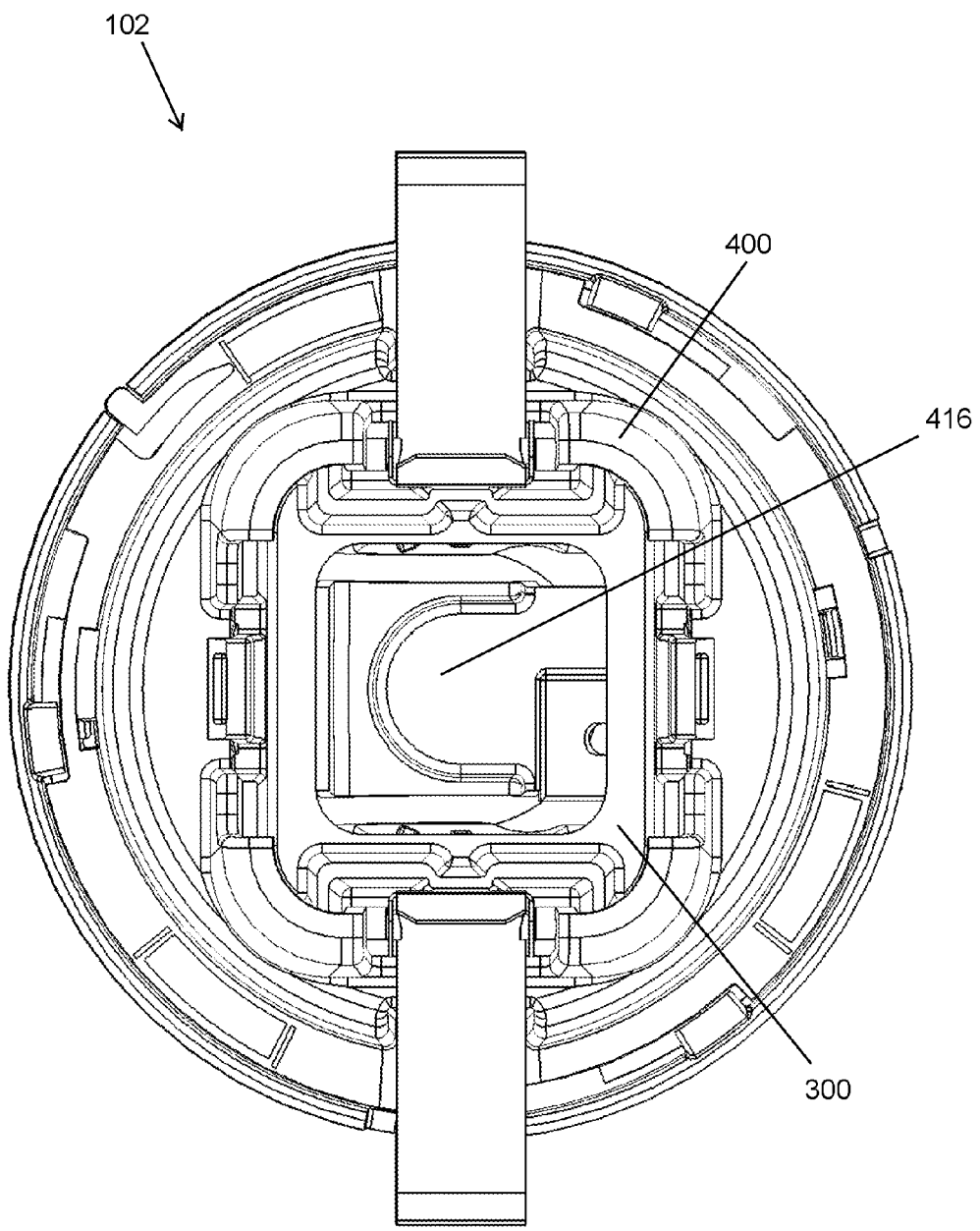
Figure 2H:
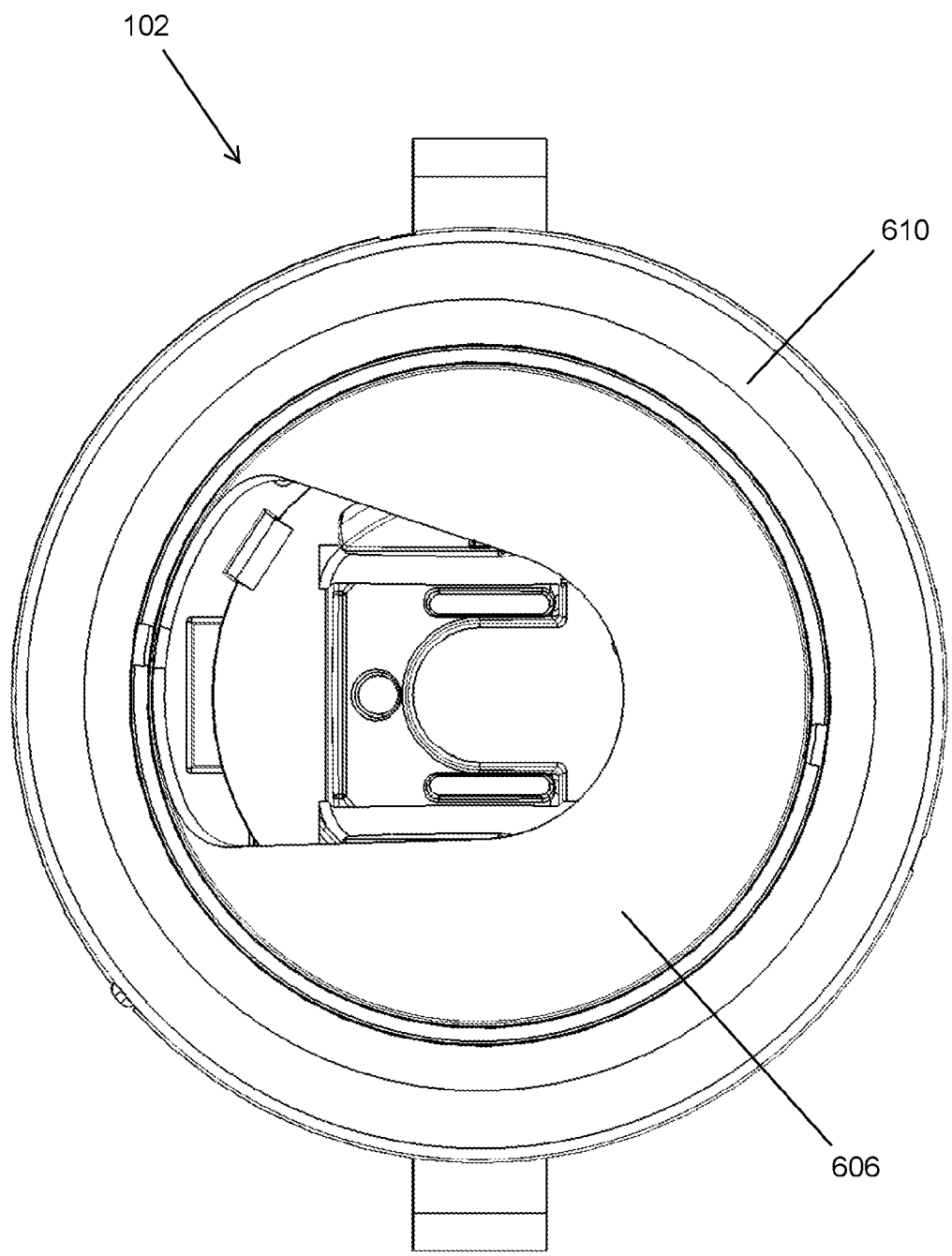

Referring now to FIGS. 2A-2H, there are respectively shown front perspective, rear perspective, right side elevation, rear elevation, left side elevation, front elevation, top plan, and bottom plan views of a mounting housing 102 in isolation, while FIGS. 1A and 1B respectively show front and rear perspective views of a camera assembly 100 comprising the mounting housing 102 and a camera 700. The camera 700 is shown in more detail in FIG. 7, and generally comprises a spherical camera head 702 that comprises a lens and an image sensor, a processing module 704 that comprises image processing circuitry and power circuitry, and a cable 706 that communicatively couples the camera head 702 and the processing module 704 together. A nub 708 is glued to the cable 706 and is used during camera installation to retain the cable 706, as discussed in further detail below. An example of the camera 700 is that used in the Avigilon™ HD Micro Dome Camera products manufactured and sold by Avigilon Corporation of Vancouver, British Columbia, Canada, although in alternative embodiments (not depicted) different types of cameras, including non-miniaturized cameras, non-dome cameras, and non-spherical cameras may be mounted using the mounting housing 102.

The mounting housing 102 generally comprises a surface contacting member 400 (shown in more detail in FIGS. 4A-4G), a sliding member 300 (shown in more detail in FIGS. 3A-3G) slidable within the surface contacting member 400, a gimbal 500 (shown in more detail in FIGS. 5A-5G) attached to an underside of the sliding member 300, and a dome assembly 610 (shown in more detail in FIGS. 6A-6G) attached to a front end of the surface contacting member 400 and used to retain the camera head 702. A pair of opposed flat/leaf springs 422a,b (collectively, "flat springs 422") extend outwardly from and are pivotably attached to the surface contacting member 400. As discussed in further detail below, while the mounting housing 102 is being mounted, the sliding member 300 protrudes downwardly from the surface contacting member 400 and the flat springs 422 are pivotable. Once the installer completes positioning the mounting housing 102, the installer pushes the sliding member 300 into the surface contacting member 400, which biases the flat springs 422 against the top surface of the ceiling and secures the mounting housing 102 into place. This biasing permits the mounting housing 102 to be mounted on to surfaces of varying thicknesses without having to manually adjust the mounting housing 102 to accommodate each different surface. For example, the depicted mounting housing 102 can be mounted to surfaces having a thickness of approximately 1 mm (0.394 inches) to approximately 25.4 mm (1 inch). If the mounting housing 102 is to be mounted on to a surface having a thickness too great or too small to be accommodated by the flexion in the springs 422, in alternative embodiments (not depicted) the mounting housing 102 may be modified to permit it to be mounted to surfaces of those greater or smaller thicknesses (e.g. by adjusting the lengths of the flat springs 422).

A shield 606 is clipped on to clips 434 (shown in FIG. 4G) on an underside of the surface contacting member 400. The shield 606 includes a slot to permit light to reach the camera head 702 while the rest of the shield 606 prevents surveillance subjects from easily determining the direction in which the camera head 702 is aimed.

Referring now to FIGS. 3A-3H, there are respectively shown perspective, right side elevation, rear elevation, left side elevation, front elevation, top plan, and bottom plan views of the sliding member 300. The sliding member 300 generally comprises a top portion 318 and a bottom portion 302. The bottom portion 302 has two opposing arcuate sides 304a,b (collectively, "arcuate sides 304") and two opposing flat sides 306a,b (collectively, "flat sides 306"), and also has a top surface 314 to which all the sides 304,306 are connected and from which the top portion 318 upwardly extends. Each of the flat sides 306 comprises a latch that is used to lock the sliding member 300 into the mounted position: the latch on one of the flat sides 306a comprises one lever arm 310a on which is located one hook 312a, while the latch on the other of the flat sides 306b comprises another lever arm 310b on which is located another hook 312b (collectively, the lever arms 310a,b are "lever arms 310" and the hooks 312a,b are "hooks 312").

The top portion 318 is shaped generally as a rounded rectangle that has two opposing long sides 320a,b (collectively, "long sides 320") and two opposing short sides 322a,b (collectively, "short sides 322"). Each of the short sides 322 comprises a channel that contacts one of the flat springs 422 when the sliding member 300 is in the mounted position and the mounting housing 102 is mounted to a ceiling: one channel 326a is in one of the short sides 322a, and another channel 326b is in the other of the short sides 322b (collectively, the channels 326a,b are "channels 326").

Each of the long sides 320 comprises a slot and a latch that prevents the sliding member 300 from sliding out of the surface contacting member 400 when the sliding member 300 is not locked in the mounted position: one slot 324a is in one of the long sides 324a, and another slot 324b is in the other of the long sides 324b (collectively, the slots 324a,b are "slots 324"). A latch comprising a lever arm 328a and a hook 330a extends upwardly into one of the slots 324a, while another latch comprising another lever arm 328b and another hook 330b extends upwardly into the other of the slots 324b (collectively, the lever arms 328a,b are "lever arms 328", and the hooks 330a,b are "hooks 330").

An opening 316 in the shape of a rounded square is present in the portion of the top surface 314 that the top portion 318 delineates. This opening 316 is visible in FIGS. 3F and 3G and is large enough to permit the processing module 704 to pass through it, which can be useful when assembling and mounting the camera assembly 100, as discussed in more detail in respect of FIGS. 10A-10H below.

Figure 3A:
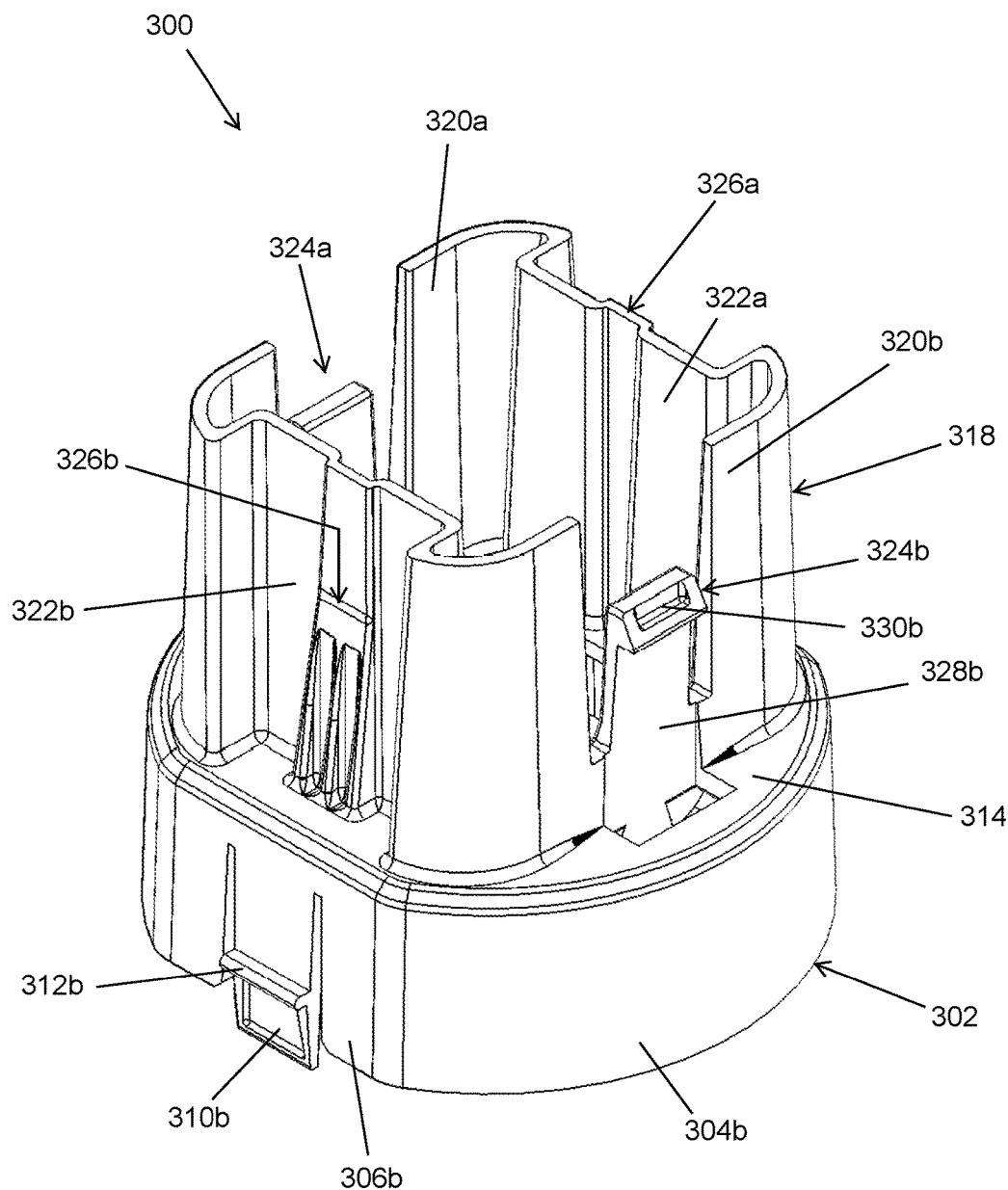
FIGS. 3A, 3B, 3C, 3D, 3E, 3F and 3G show perspective, right side elevation, rear elevation, left side elevation, front elevation, top plan, and bottom plan views, respectively, of a sliding member that comprises part of the mounting housing of FIGS. 1A and 1B.
Figure 3B:
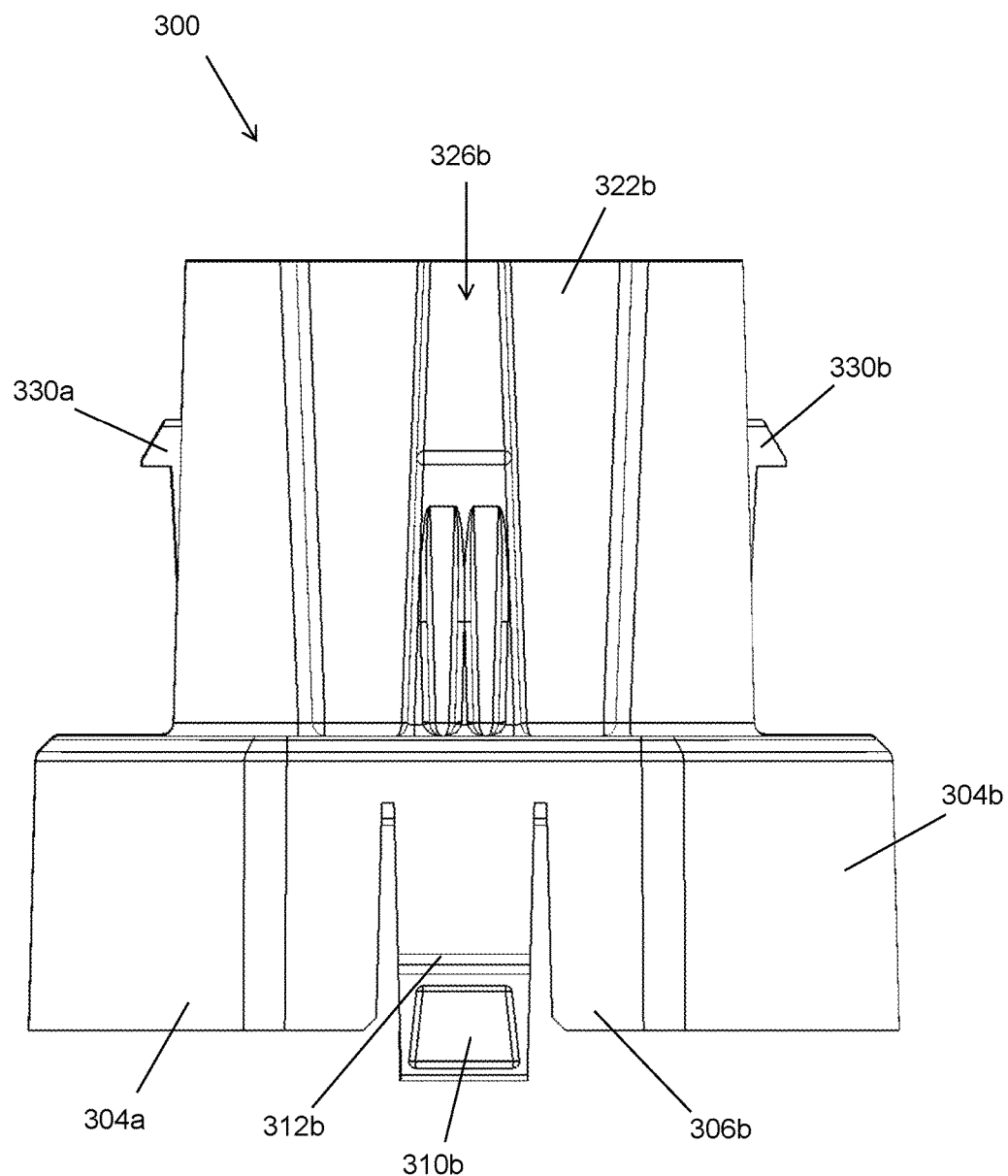
Figure 3C:
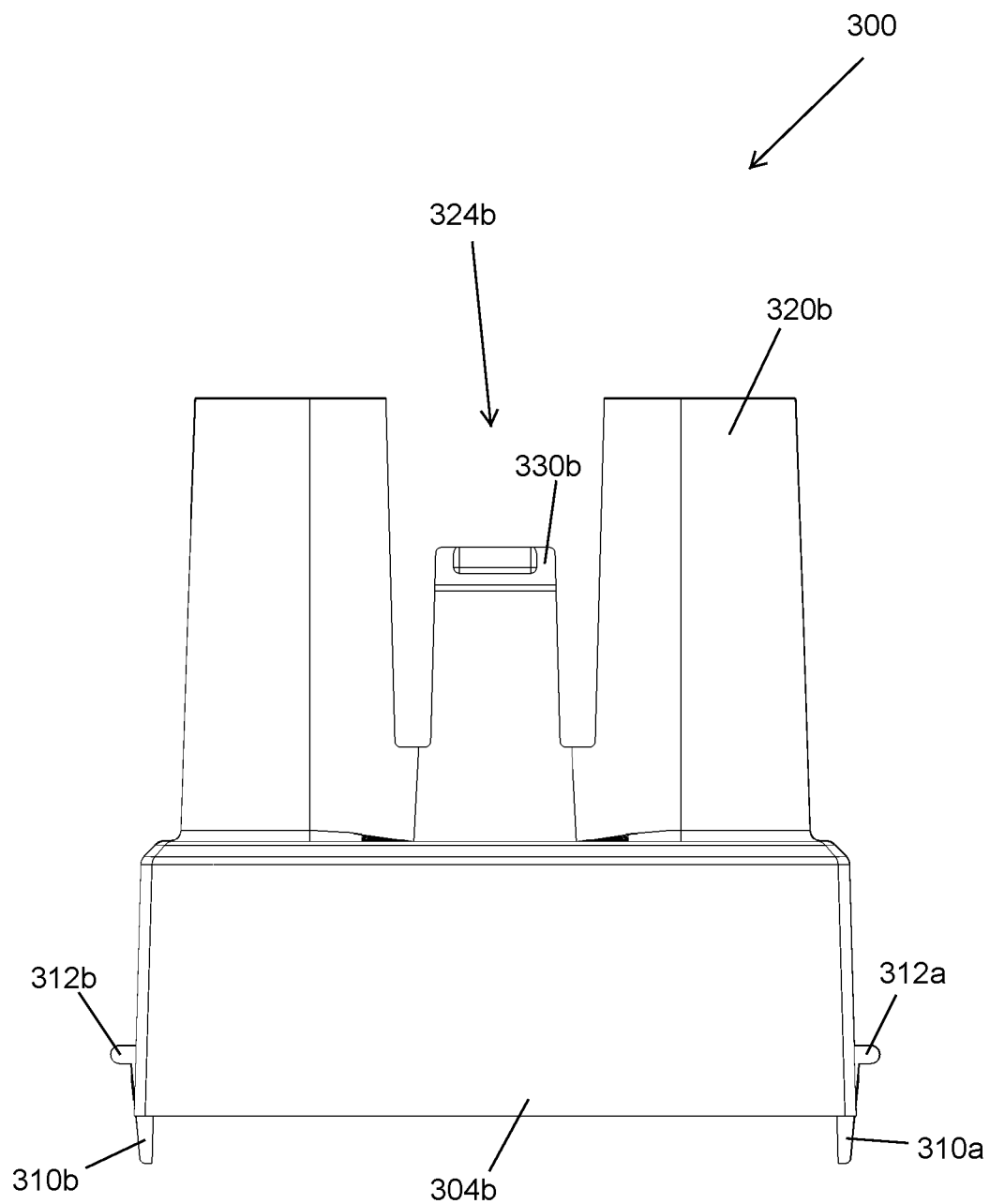
Figure 3D:
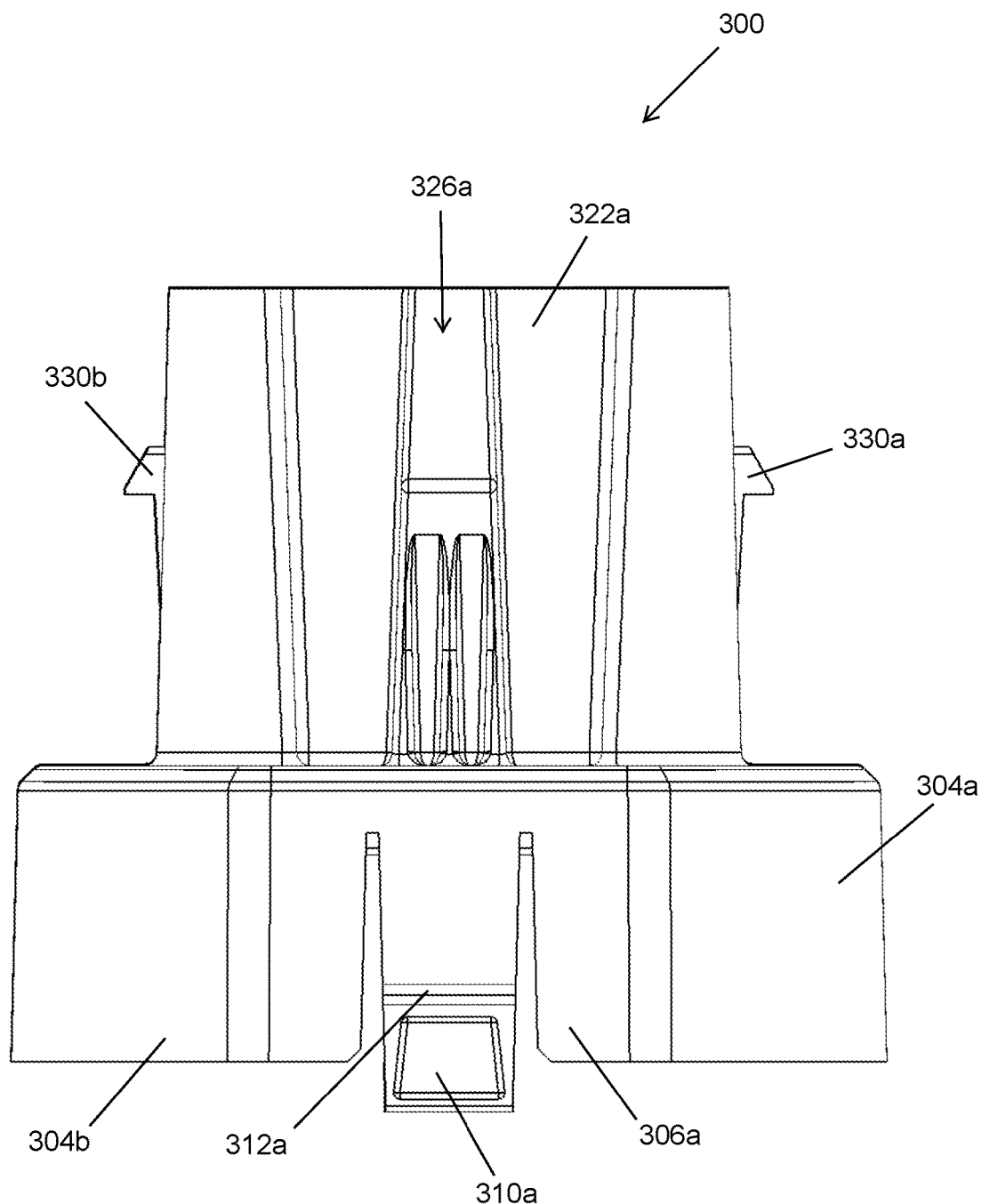
Figure 3E:
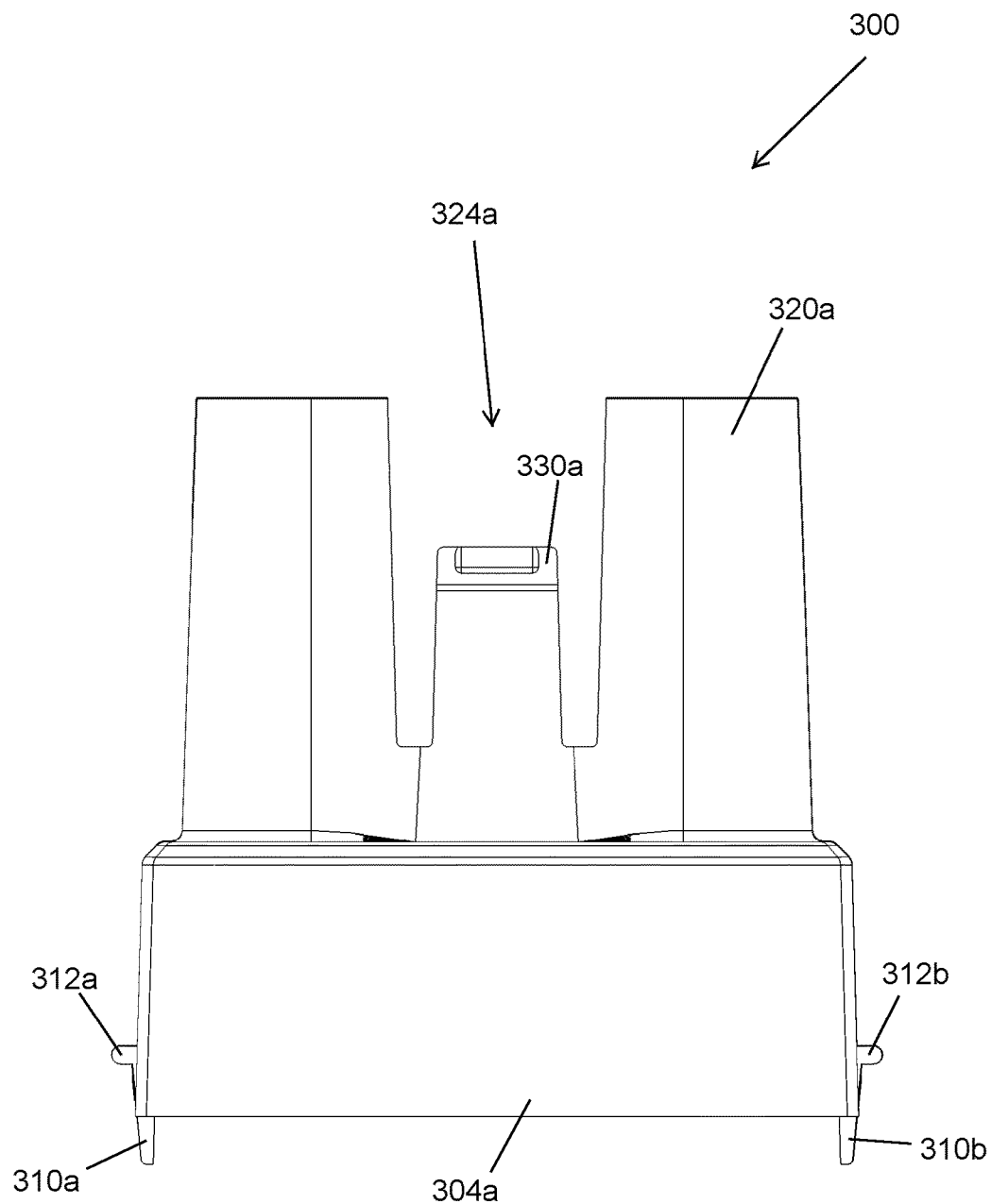
Figure 3F:
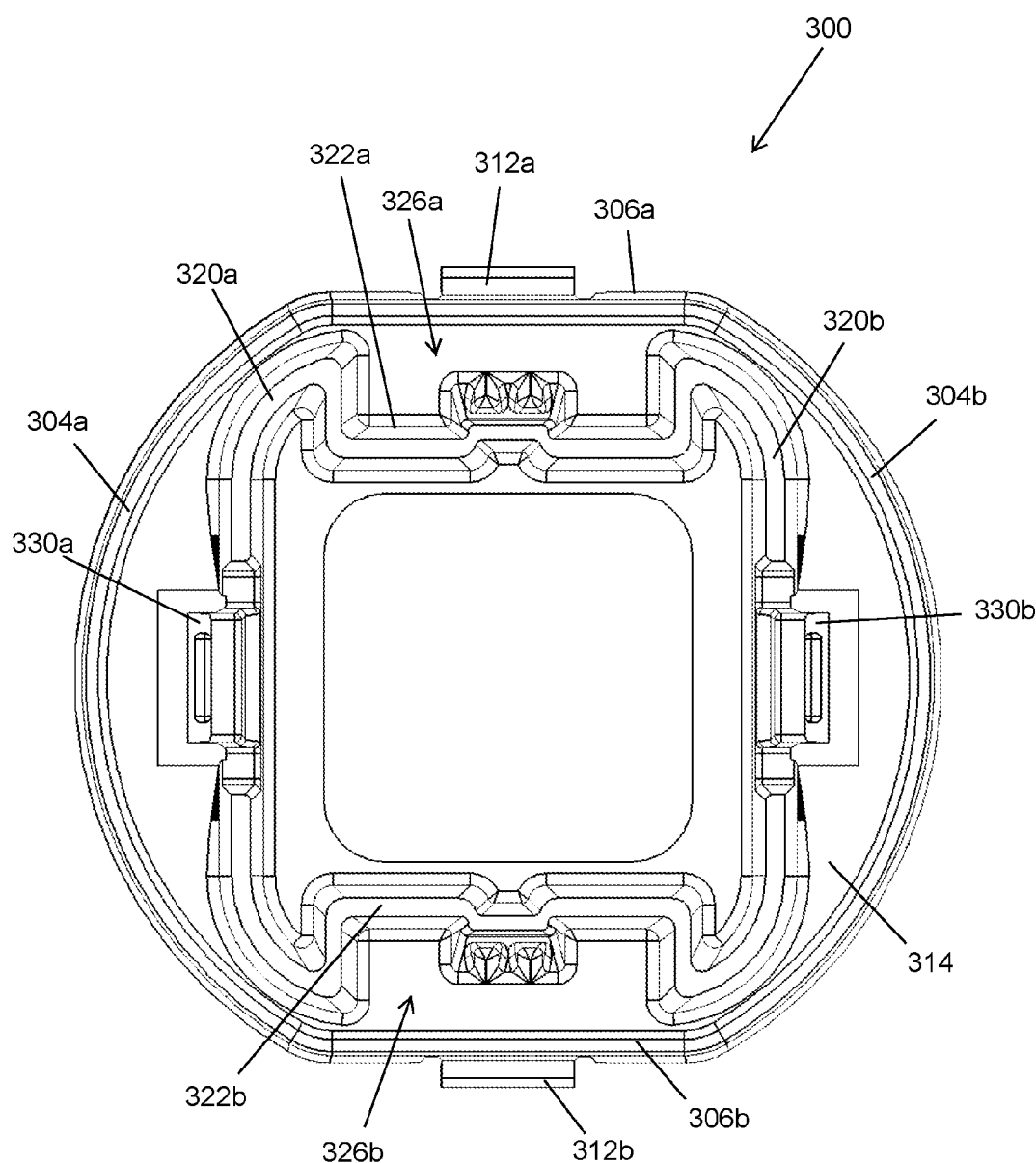
Figure 3G:
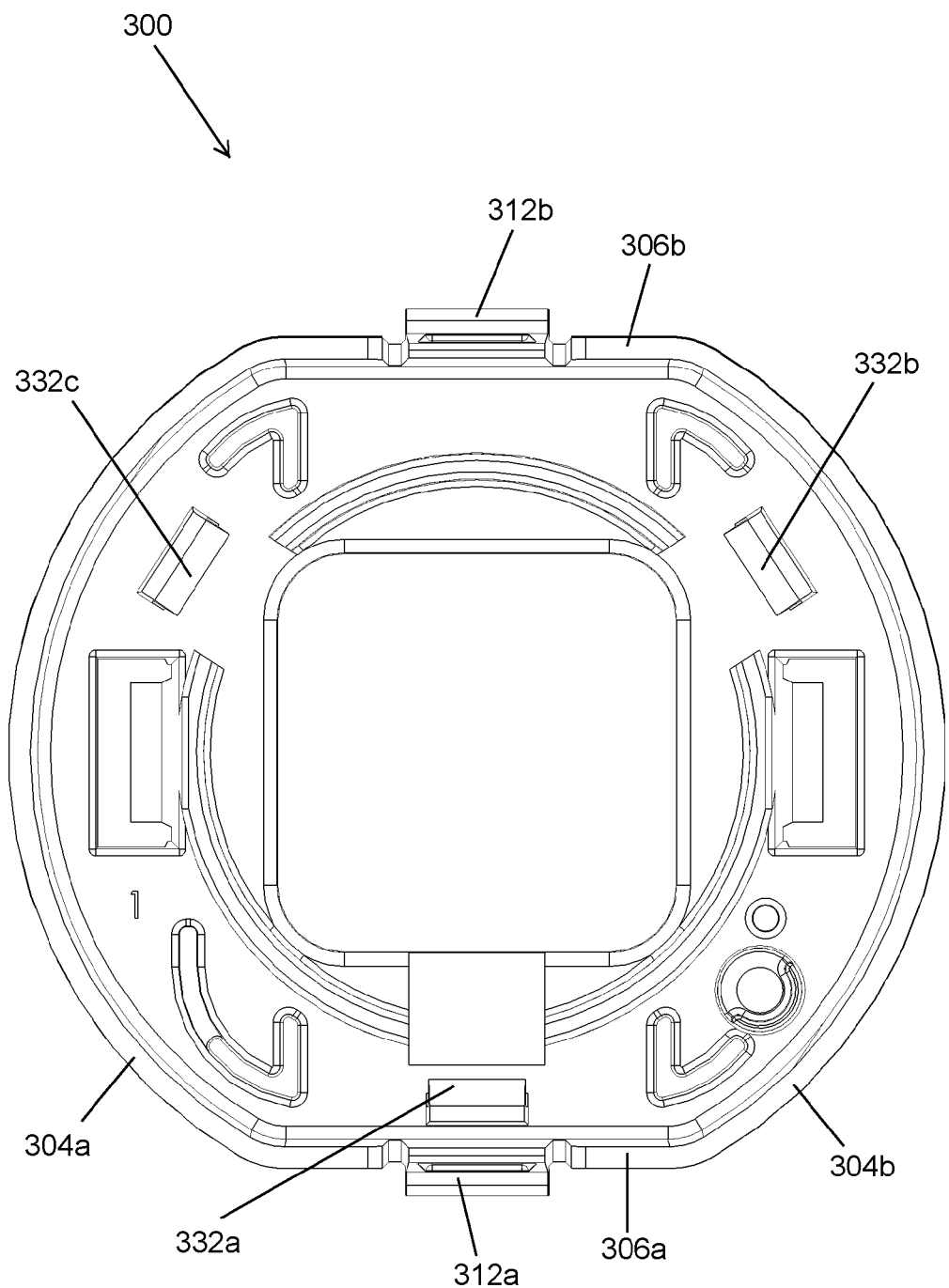

Extending downwardly from an underside of the top surface 314 and visible in FIG. 3G are three gimbal latches 332a-c (collectively, "gimbal latches 332") used to secure the gimbal 500 to the underside of the sliding member 300. Perspective, right side elevation, rear elevation, left side elevation, front elevation, top plan, and bottom plan views, respectively, of the gimbal 500 are shown in FIGS. 5A-5G. The gimbal 500 comprises a top surface 510 comprising a cable slot 516 that is used to securely retain the cable 706 of the camera 700. A lip 514 extends upwardly from the gimbal's 500 top surface 510 and, except for the cable slot 516, circumscribes the gimbal's 500 top surface 510. A flange 512 extends from the lip 514 to the periphery of the top surface 510.

Extending downwardly from the top surface 510 are a seat 502 and, on either side of the seat 502, first and second arms 504a,b (collectively, "arms 504"). As shown in FIGS. 5A-5G, the arms 504 are spaced to frictionally retain the camera head 702. On the side of each of the arms 504 that contacts the camera head 702 are ridges 506 to aid in frictionally retaining the camera head 702 and to press the camera head 702 into the seat 502. While three ridges 506 are depicted, in alternative embodiments (not depicted) more or less than three ridges 506 may be used. Each of the sides of the arms 504 that contacts the camera head 702 extends linearly; that is, they are manufactured using straight cuts, which simplifies tooling compared to a design in which the sides of the arms 504 that contact the camera head 702 are curved. The surface of the seat 502 that contacts the camera head 702 is curved to better receive the camera head 702, whose surface is curved. While the depicted sides of the arms 504 that contact the camera head 702 are manufactured using a single straight cut, in alternative embodiments (not shown) they may be manufactured using a curved cut or a series of straight cuts that, for example, are used to manufacture a side comprising a series of connected line segments.

Figure 8:
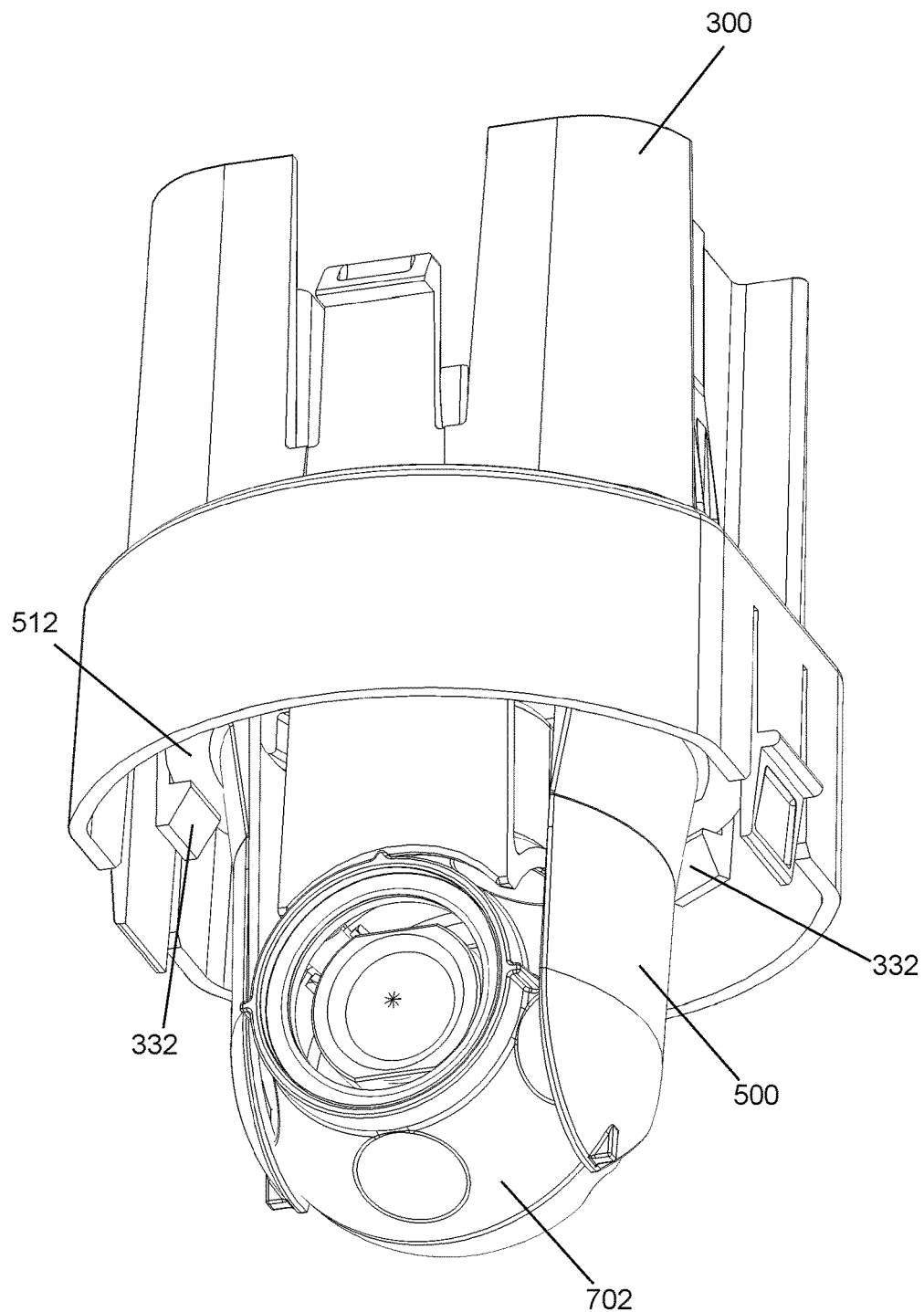
FIG. 8 shows a perspective view of the gimbal of FIGS. 5A-5G holding a camera head that comprises part of the spherical camera of FIGS. 1A and 1B, with the gimbal secured to the sliding member of FIGS. 3A-3G.

As shown in FIG. 8, to secure the gimbal 500 to the underside of the sliding member 300, the flange 512 is pressed against the bottoms of the gimbal latches 332. Each of the gimbal latches 332 comprises a lever arm at the end of which is a hook; pressing the flange 512 into the gimbal latches 332 flexes the lever arms and causes the hooks to catch on the underside of the flange 512, securing the gimbal 500 to the underside of the sliding member 300. The lip 514 (not shown in FIG. 8, but visible in FIGS. 5A-5G) maintains sufficient distance between the gimbal 500 and the sliding member 300 so that the flange 512 remains pressed against the gimbal latches 332 and the gimbal 500 remains secure.

Referring now to FIGS. 4A-4G, there are respectively shown perspective, right side elevation, rear elevation, left side elevation, front elevation, top plan, and bottom plan views of the surface contacting member 400. The surface contacting member 400 comprises a generally cylindrical base 402 and a top portion 414 extending upwardly from the base 402. A flange 404 extends along the periphery of a bottom edge of the base 402, and is the "front end" of the surface contacting member 400; that is, the flange 404 is below the ceiling and contacts a bottom surface of the ceiling when the mounting housing 102 is mounted. On the top side of the flange 404 are three rubber pads 432 that enhance friction between the underside of the ceiling and the top side of the flange 404. Two slots 406a,b are located 180° apart on the base and are shaped to receive the hooks 312a,b on the flat sides 306a,b of the sliding member 300.

The base 402 also has a top surface 412 from which the top portion 414 extends. The top portion 414 is a rounded rectangle with two opposing long sides 424a,b (collectively, "long sides 424") and two opposing short sides 426a,b (collectively, "short sides 426"). The rounded rectangle delineates an interior conduit 416 through which the top portion 318 of the sliding member 300 is slidable. Each of the long sides 424 comprises a slot for receiving one of the hooks 330 on the long sides 324 of the sliding member 300: one slot 420a is in one of the long sides 424a and receives one of the hooks 330a from the sliding member 300, and another slot 420b is in the other of the long sides 424b and receives the other of the hooks 330b from the sliding member 300 (collectively, the slots 420a,b are "slots 420"). When the mounting housing 102 is upright and the sliding member 300 is in the un-mounted position and is unsupported from below, the hooks 330 latch on to the top surface 412 of the base 402 and prevent the sliding member 300 from falling out of the surface contacting member 400.

Each of the short sides 426 also comprises a slot, which is used to pivotably couple the flat springs 422 to the surface contacting member 400: one slot 418a is in one of the short sides 426a, and one of the flat springs 422a is pivotably coupled to the edges of that slot 418a, and the other of the slots 418b is in the other of the short sides 426b, and the other of the flat springs 422b is pivotably coupled to the edges of that other slot 418b (collectively, the slots 418a,b are "slots 418"). Each of the flat springs 422 has two ends, and is pivotably coupled to the edges of one of the slots 418 between its two ends. The flat springs 422 are coupled to the slots 418 such that when the mounting housing 102 is mounted and the sliding member 300 is in the mounted position, the channels 326 in the top portion 318 of the sliding member 300 contact the ends of the flat springs 422 that have pivoted into the interior conduit 416, and thereby bias the flat springs 422 against the top of the ceiling.

Along the surface contacting member's 400 flange 404 are three ramps 428a-c (collectively, "ramps 428") and a tab 430 that can be coupled to three ledges 604a-c (collectively, "ledges 604") and any one of three notches 608, respectively, located on a trim ring 600. FIGS. 6A-6G respectively show perspective, right side elevation, rear elevation, left side elevation, front elevation, top plan, and bottom plan views of a dome assembly 610 comprising the trim ring 600 and a dome 602. The trim ring 600 can be screwed on to the flange 404 of the surface contacting member 400. When screwed on to the flange 404, the ledges 604 slide up the ramps 428 resulting in an interference fit that retains the trim ring 600 and dome 602 on the surface contacting member 400. The tab 430 fits into one of the notches 608, which helps prevent accidental removal of the dome assembly 610 from the surface contacting member 400.

The difference between the mounting housing's 102 mounted and un-mounted positions is highlighted in FIGS. 9A-9D, which respectively show front elevation views of the surface contacting member 400 and sliding member 300 in the mounted and un-mounted positions, and right side elevation views of the surface contacting member 400 and sliding member 300 in the mounted and un-mounted positions.

Figure 4A:
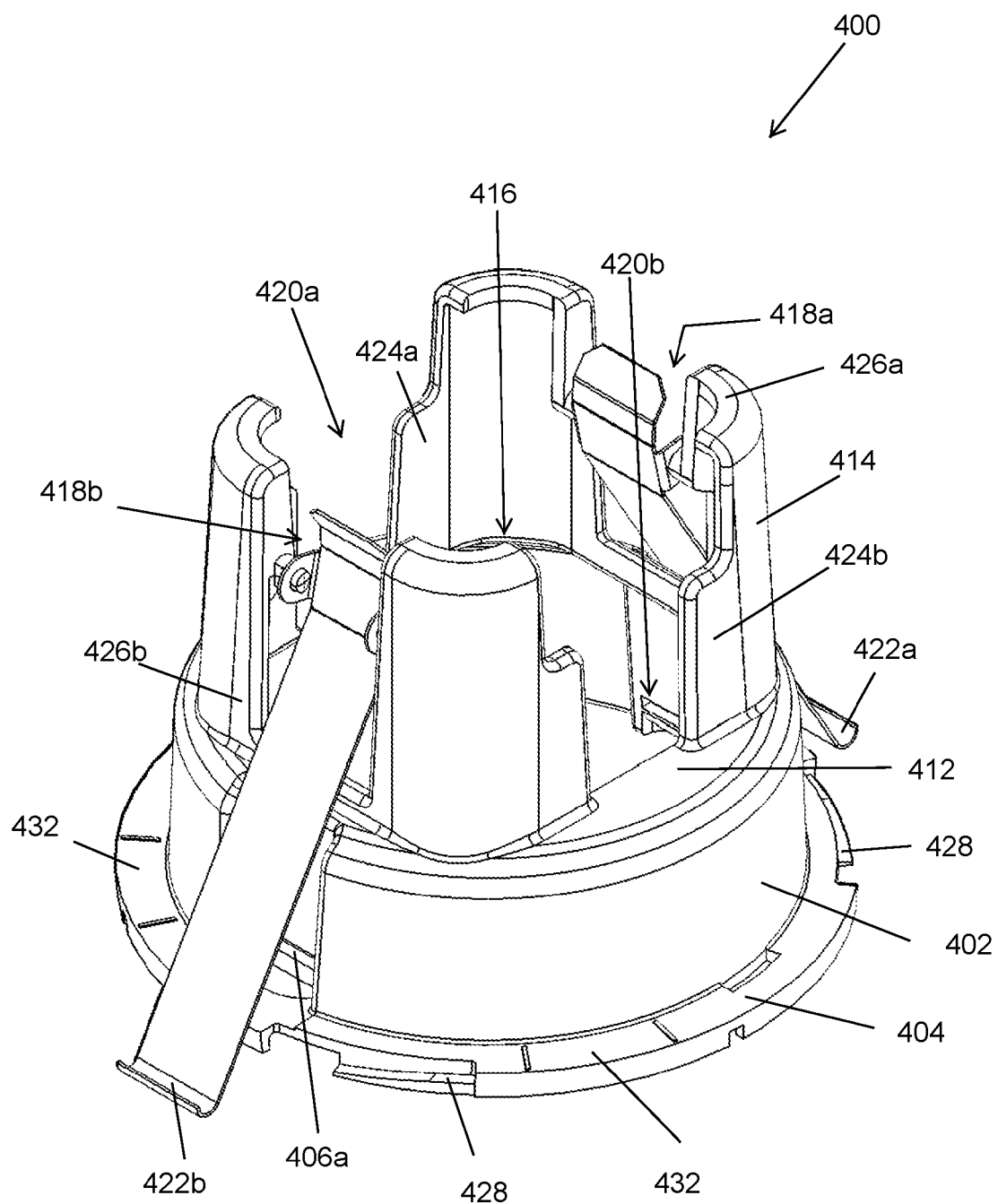
FIGS. 4A, 4B, 4C, 4D, 4E, 4F and 4G show perspective, right side elevation, rear elevation, left side elevation, front elevation, top plan, and bottom plan views, respectively, of a surface contacting member that comprises part of the mounting housing of FIGS. 1A and 1B.
Figure 4B:
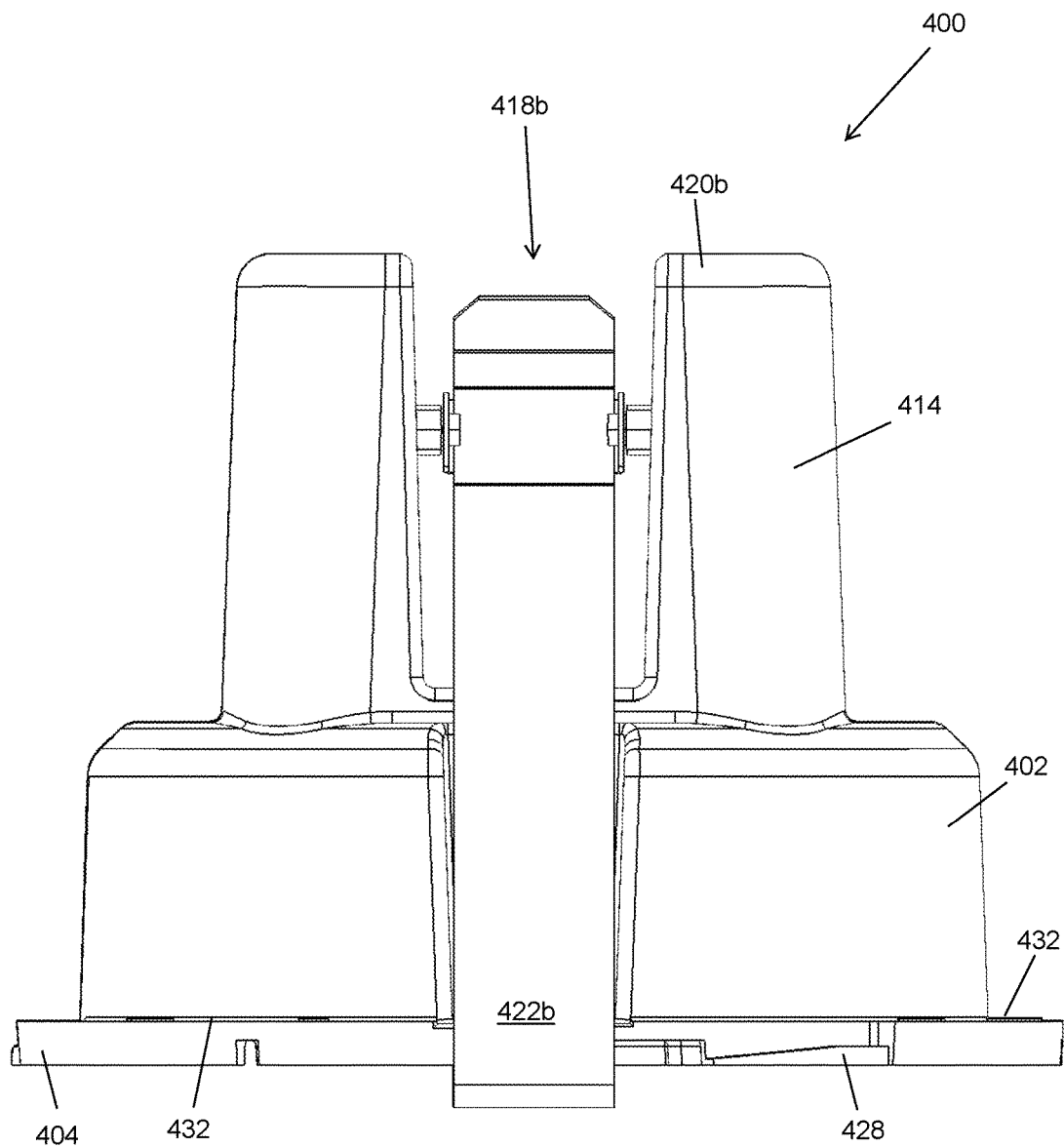
Figure 4C:
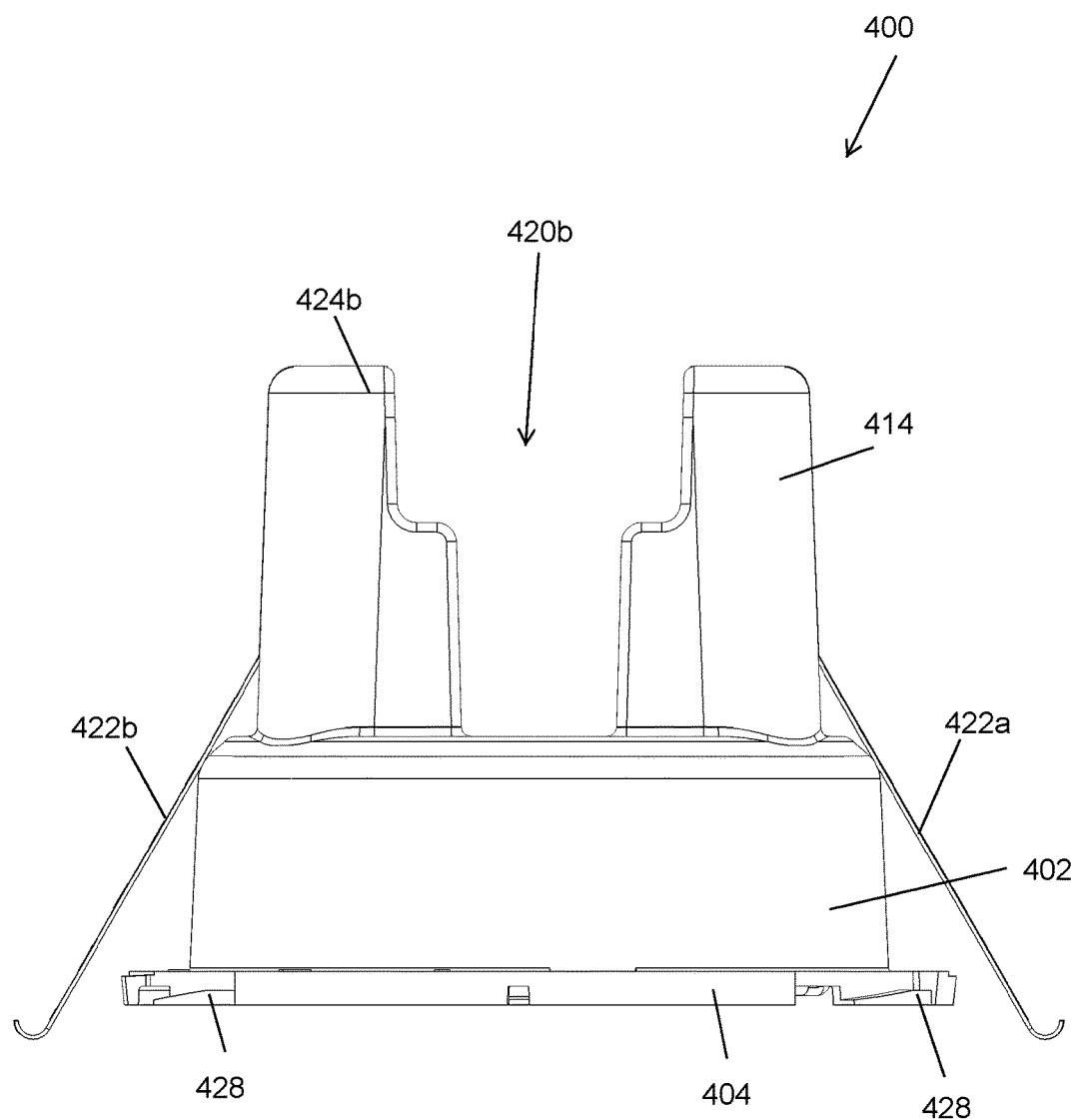
Figure 4D:
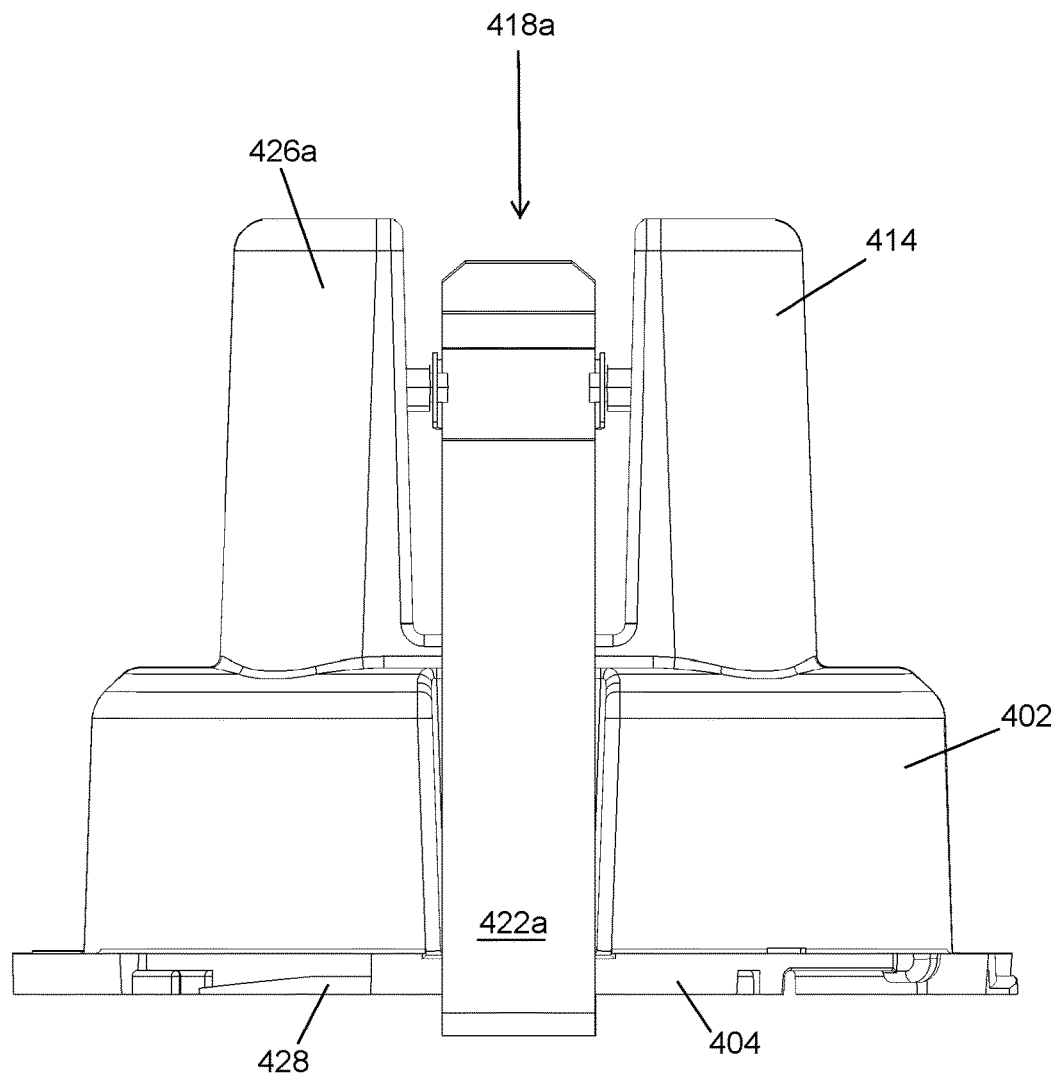
Figure 4E:
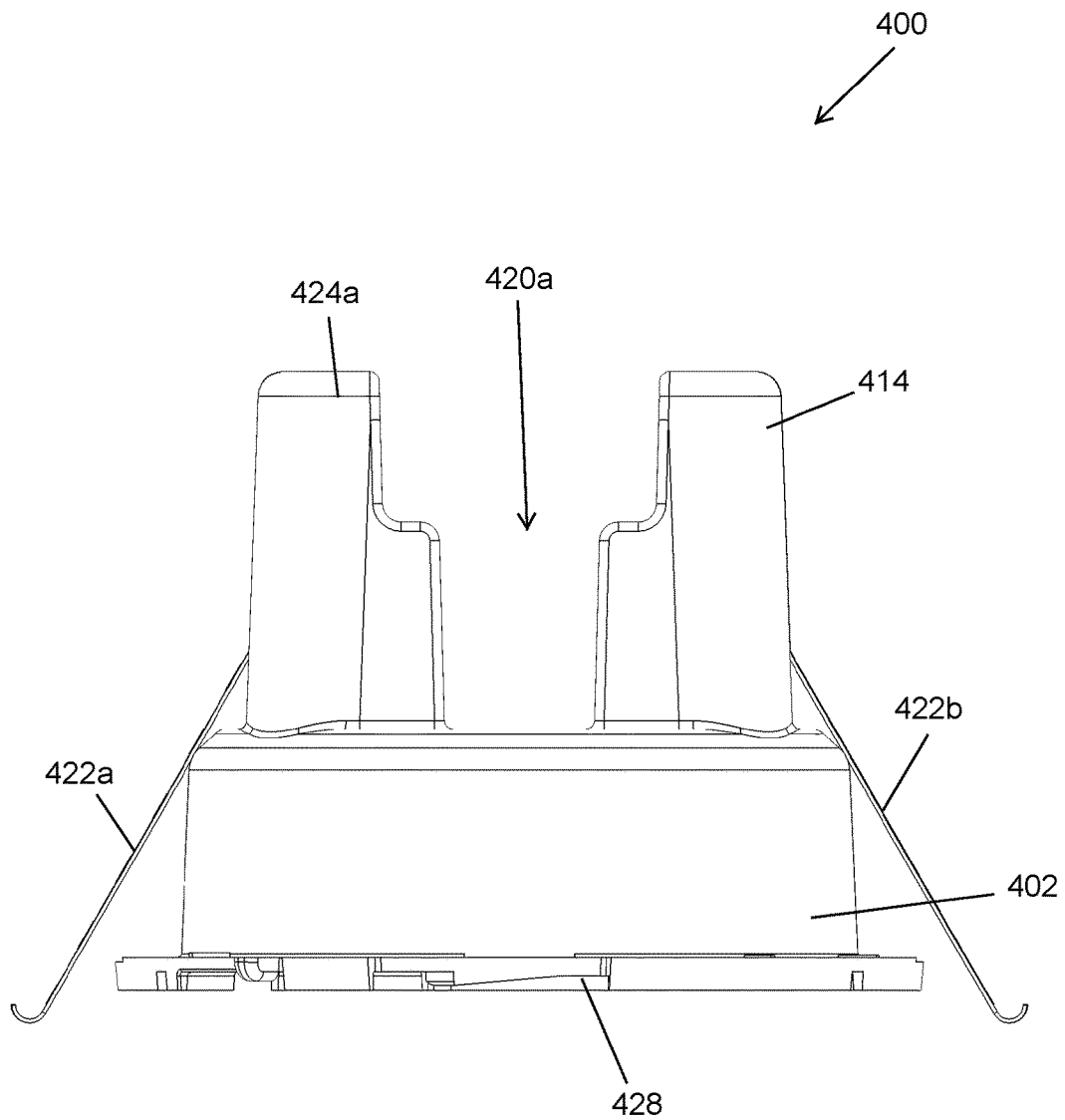
Figure 4F:
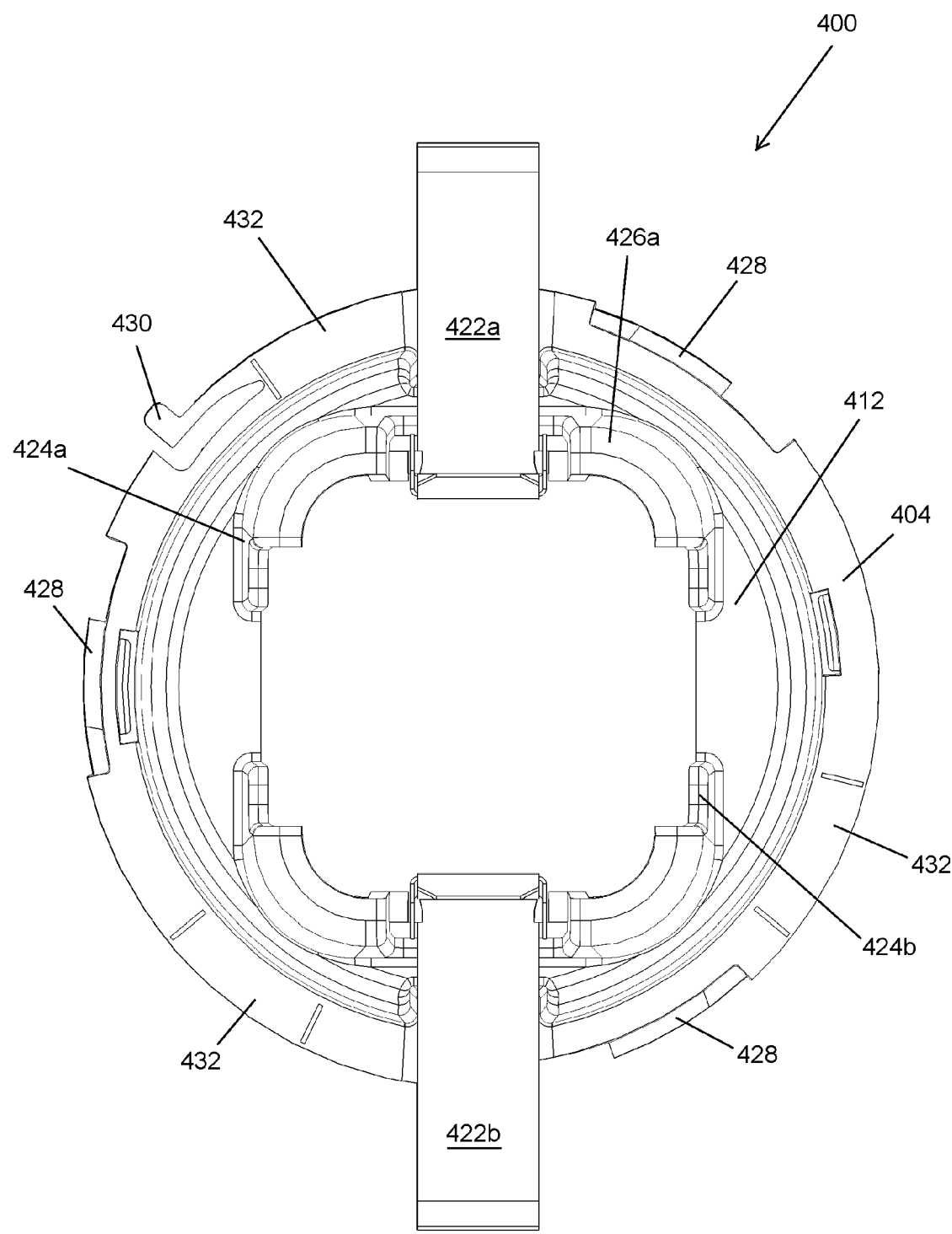
Figure 4G:
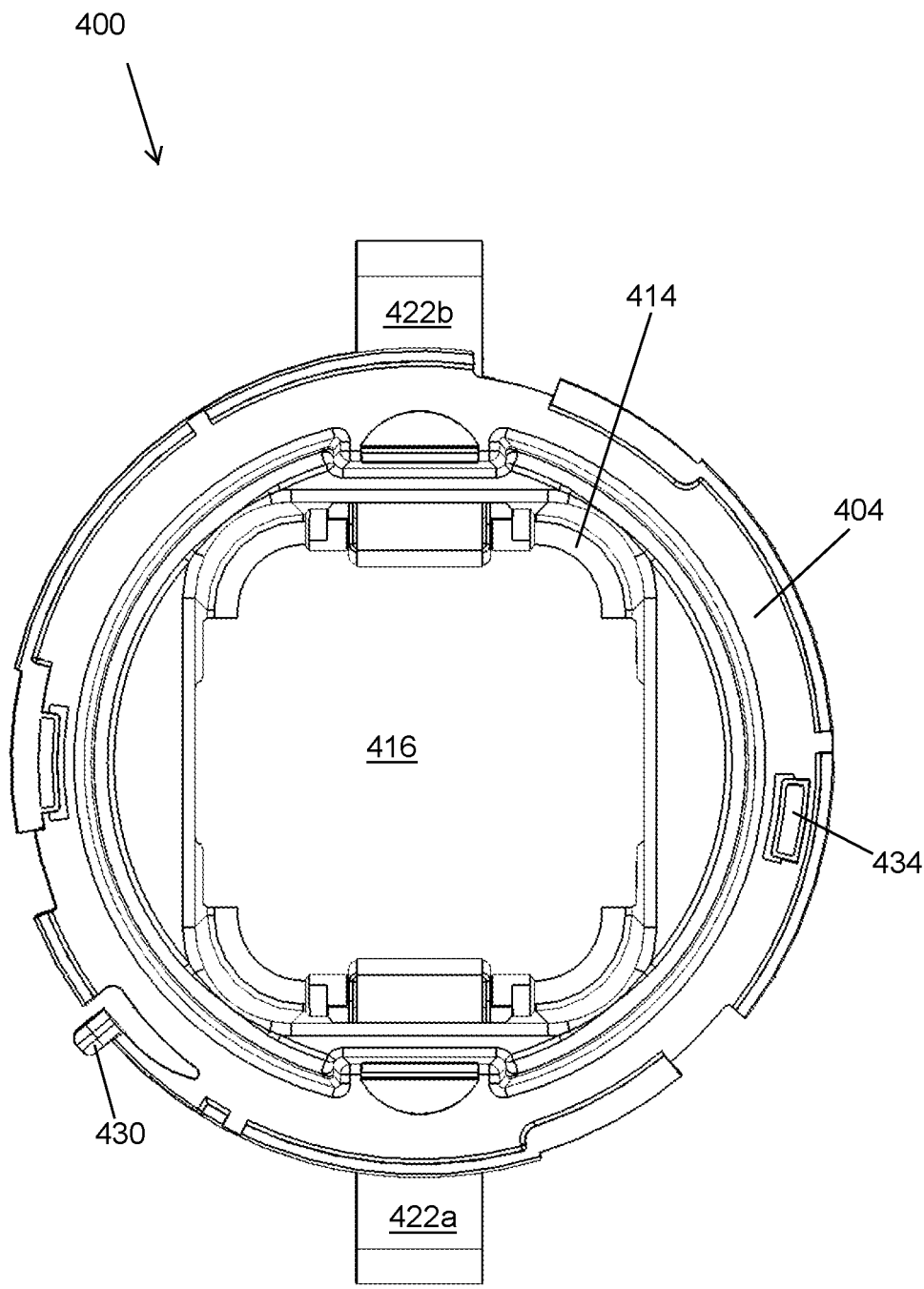
Figure 5A:
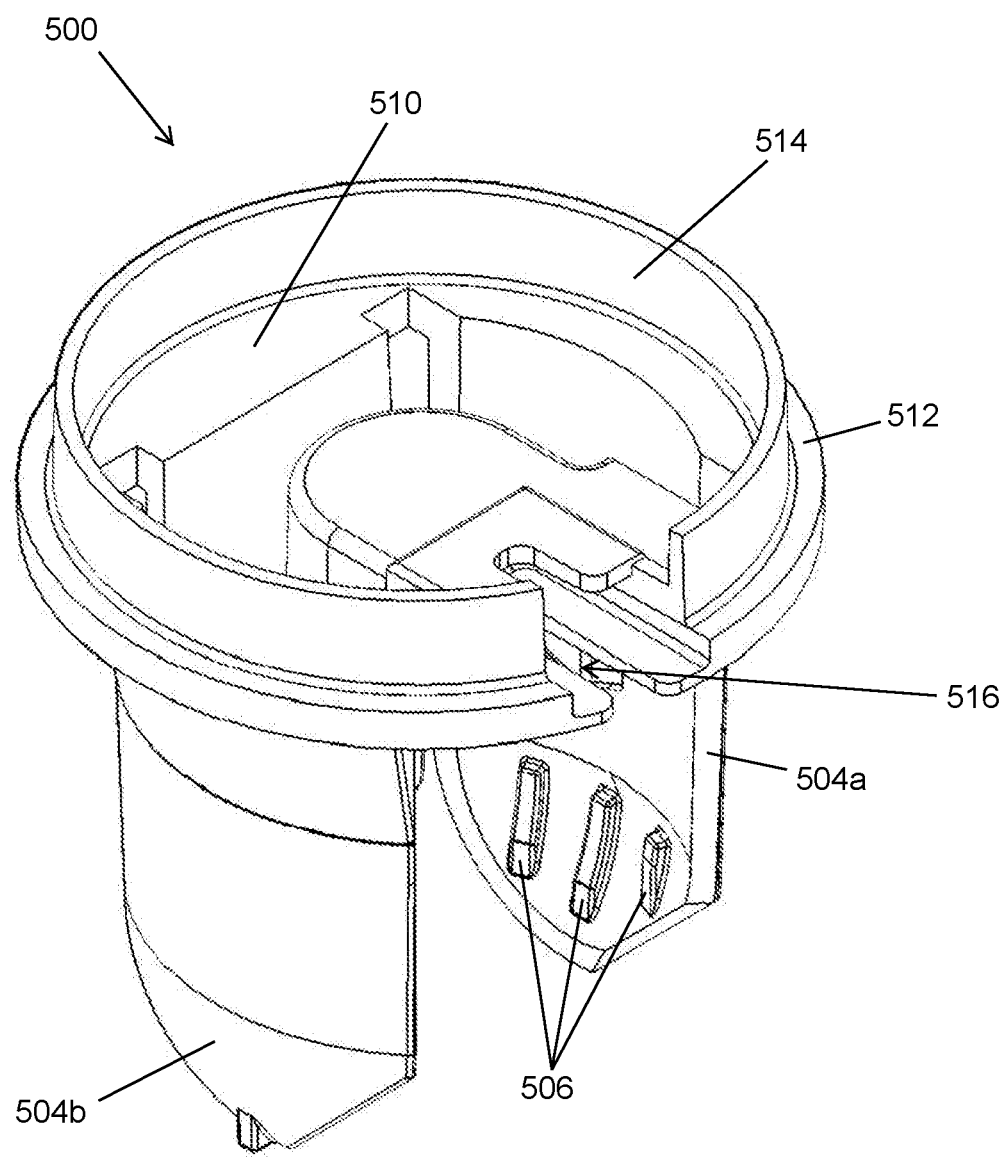
FIGS. 5A, 5B, 5C, 5D, 5E, 5F and 5G show perspective, right side elevation, rear elevation, left side elevation, front elevation, top plan, and bottom plan views, respectively, of a gimbal that comprises part of the mounting housing of FIGS. 1A and 1B.
Figure 5B:
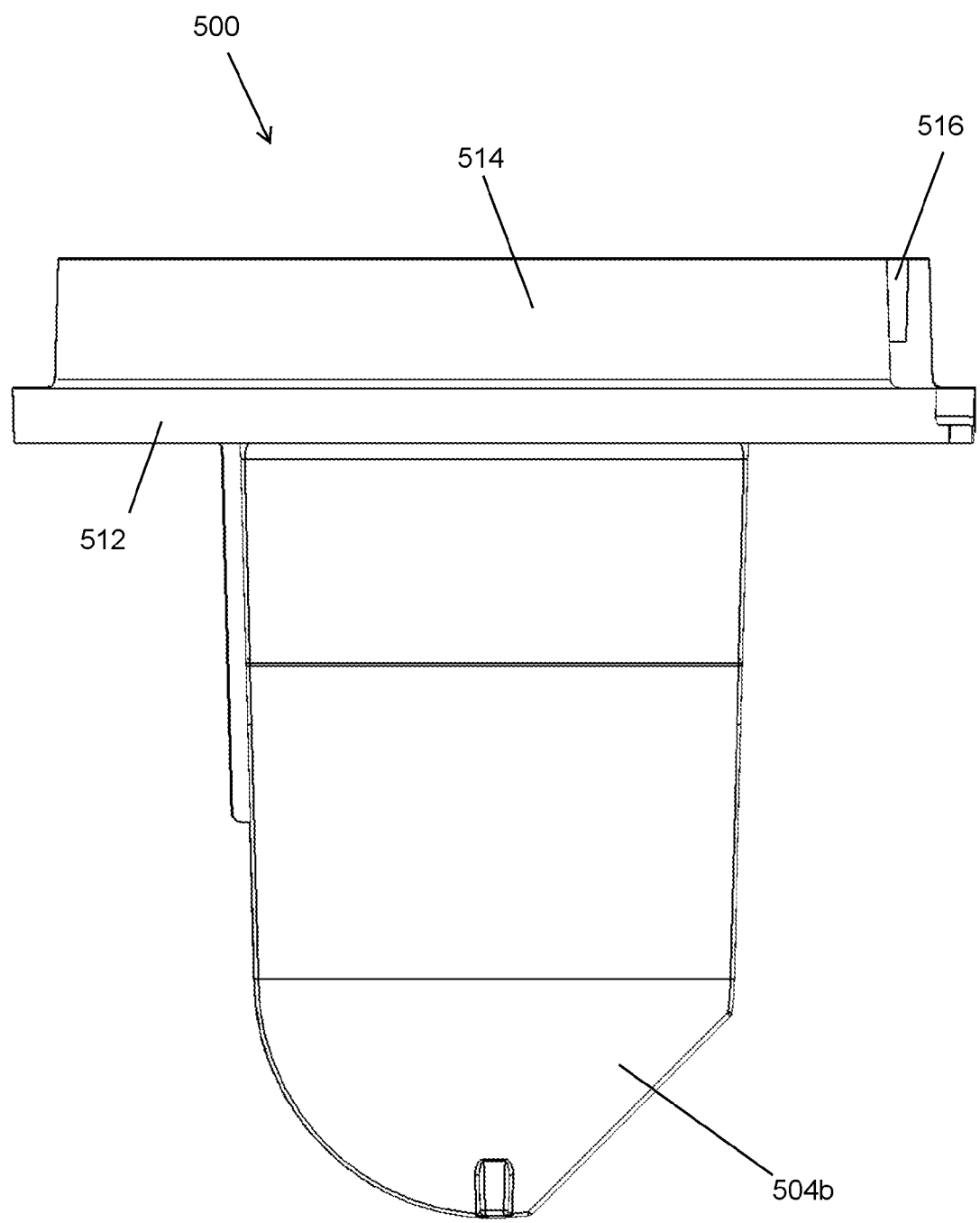
Figure 5C:
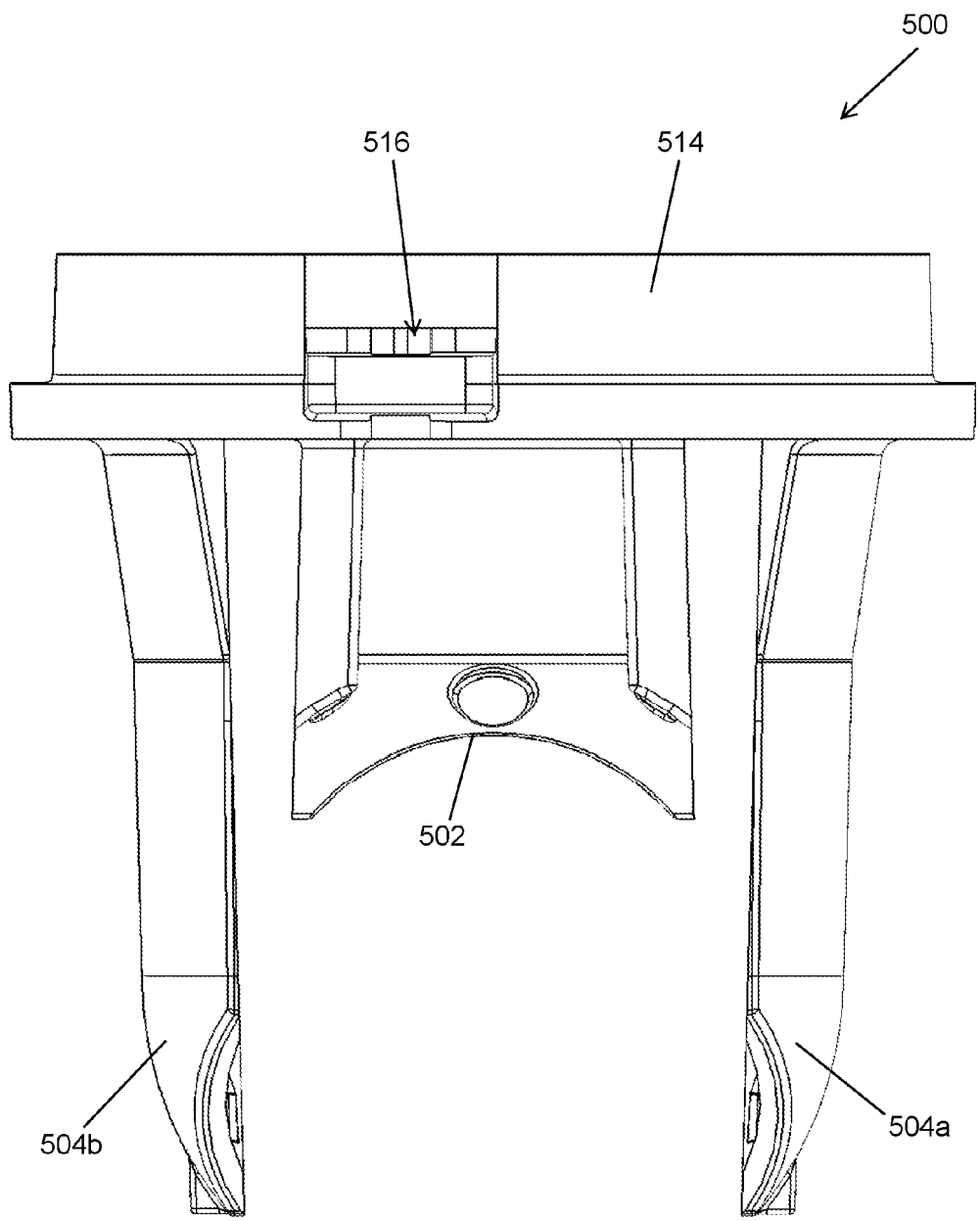
Figure 5D:
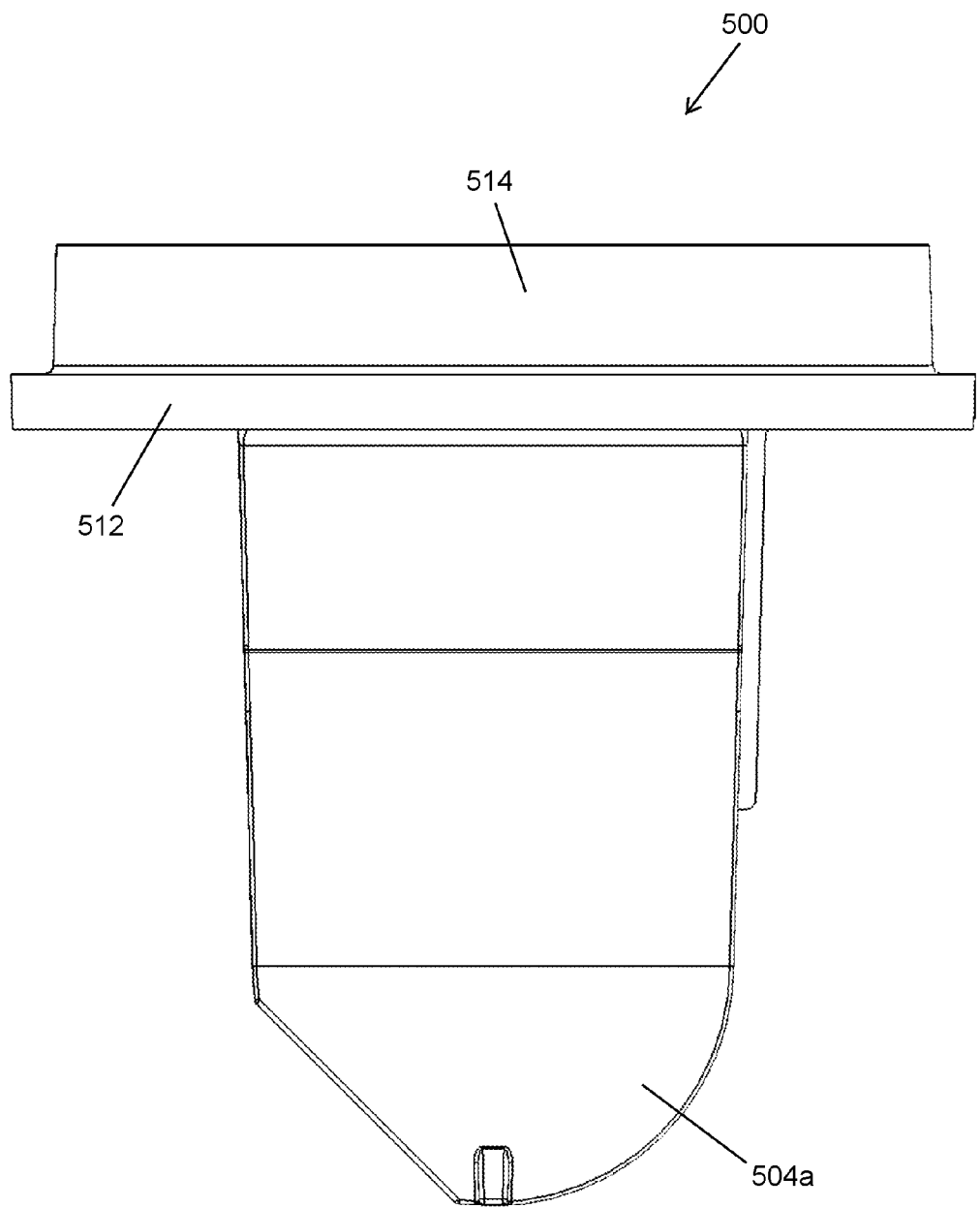
Figure 5E:
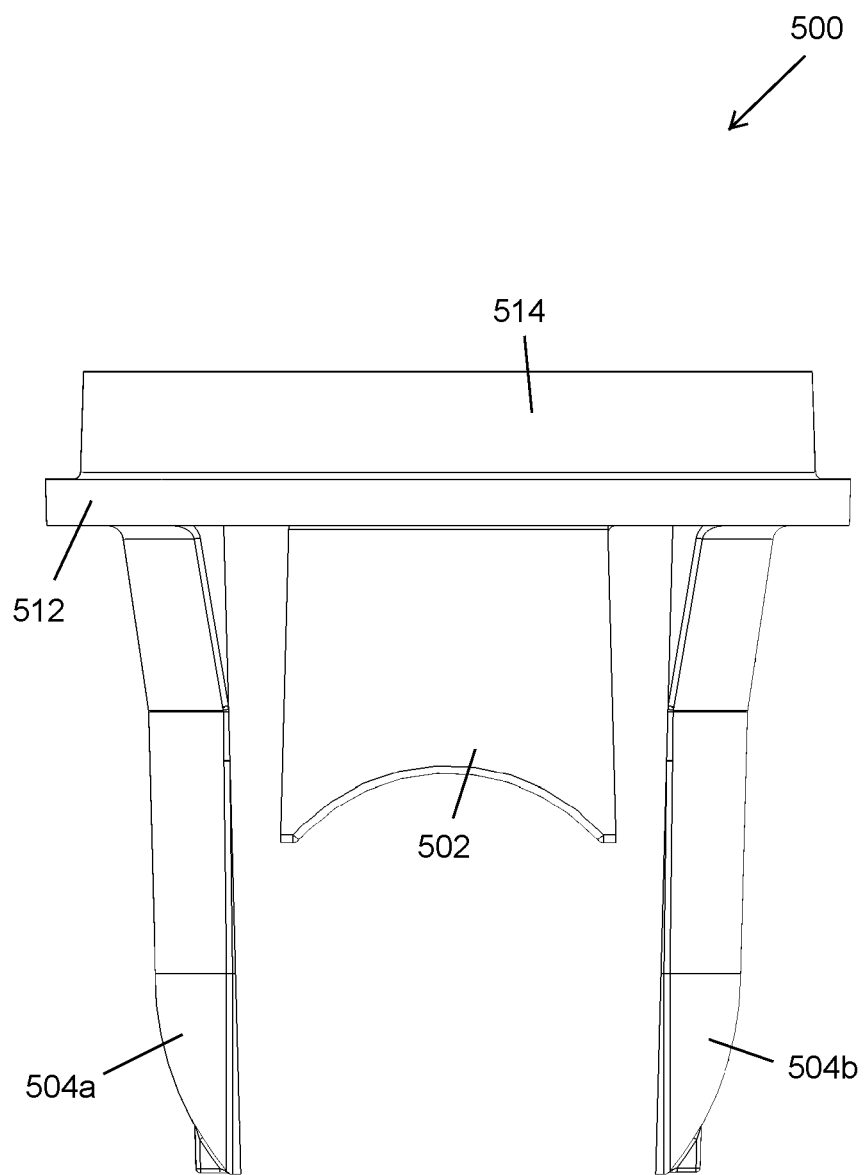
Figure 5F:
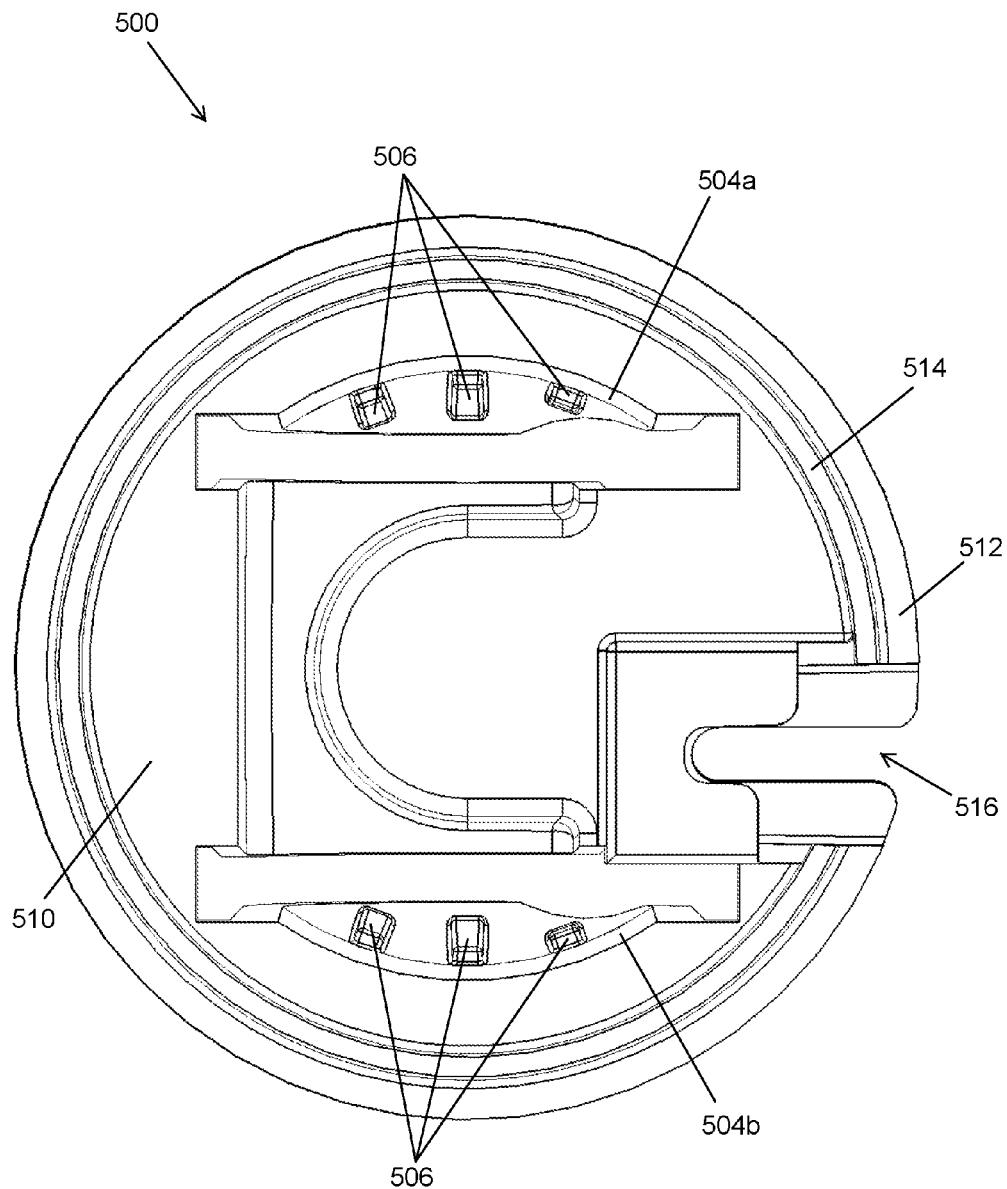
Figure 5G:
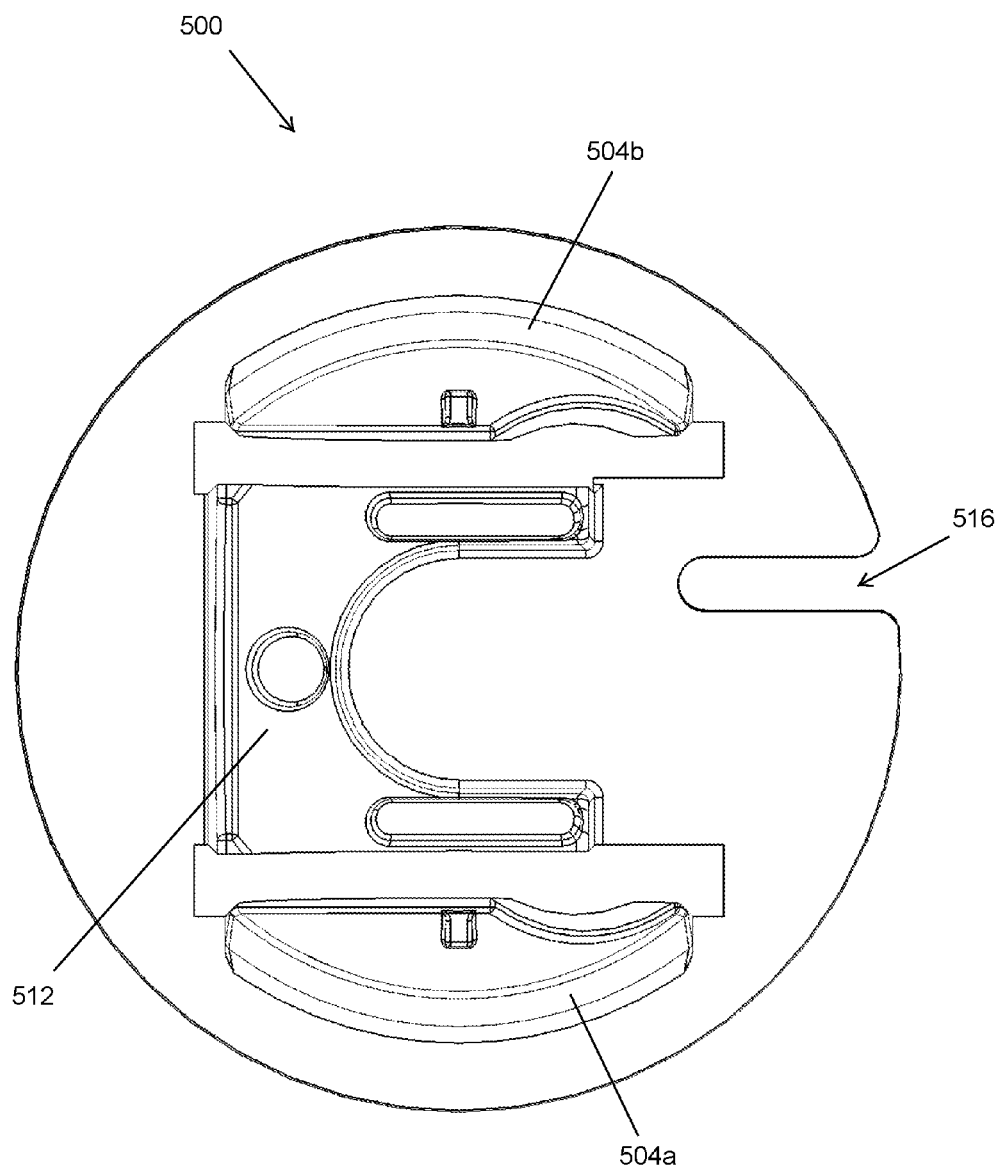
Figure 6A:
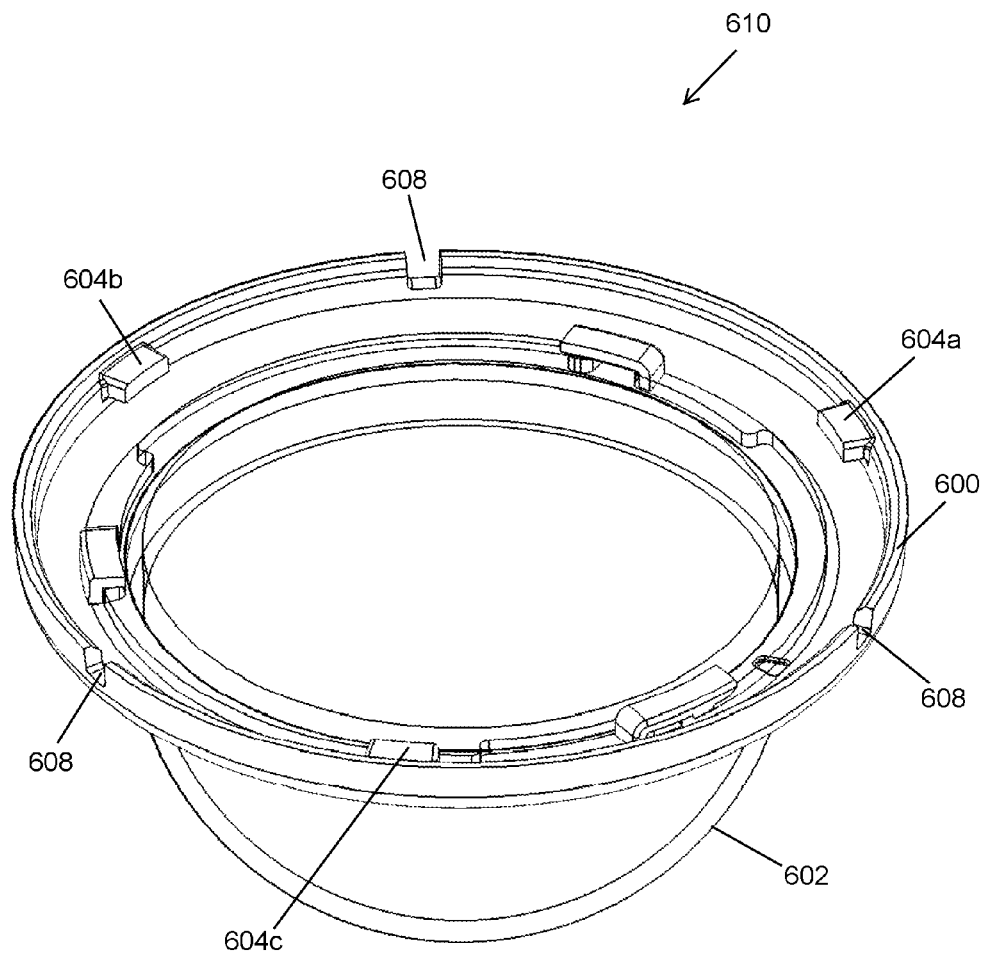
FIGS. 6A, 6B, 6C, 6D, 6E, 6F and 6G show perspective, right side elevation, rear elevation, left side elevation, front elevation, top plan, and bottom plan views, respectively, of a dome assembly that comprises part of the mounting housing of FIGS. 1A and 1B.
Figure 6B:
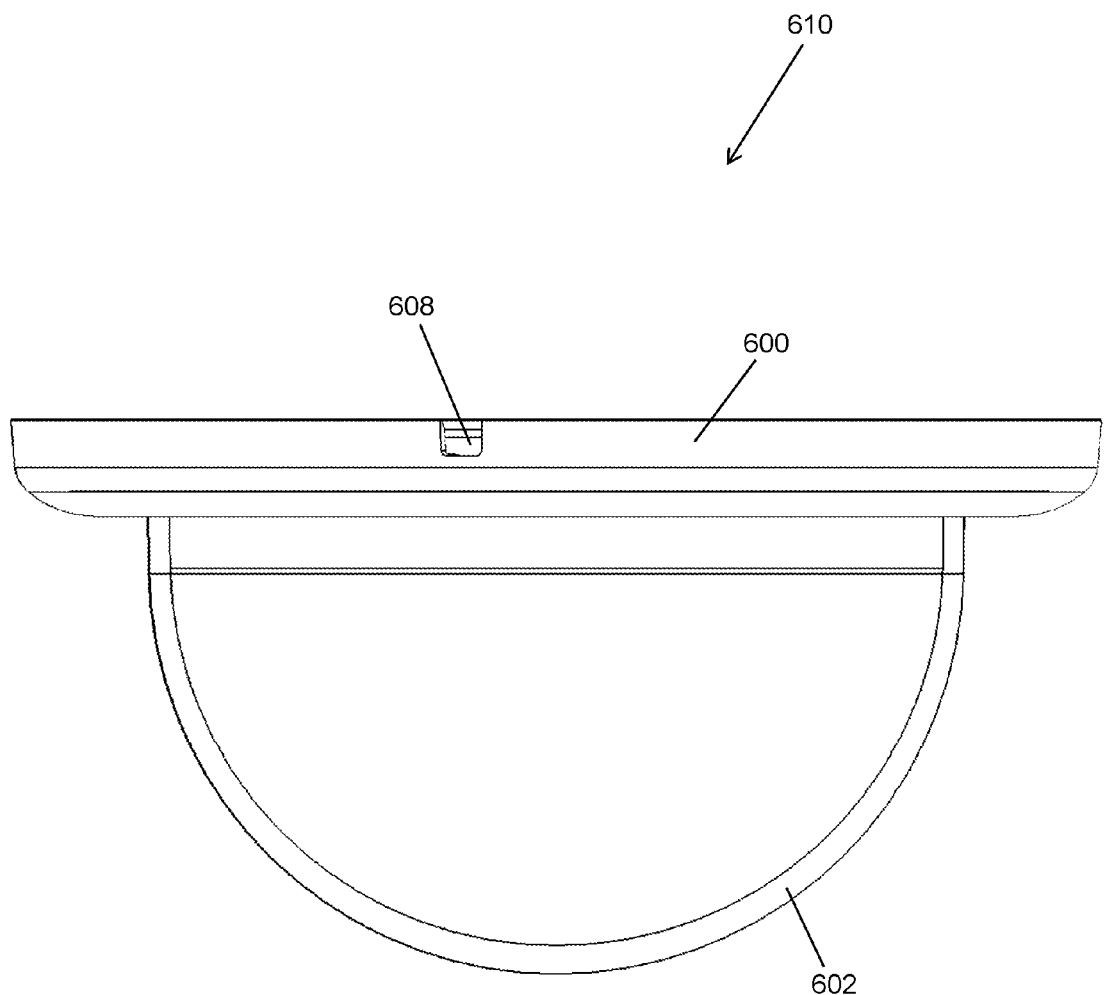
Figure 6C:
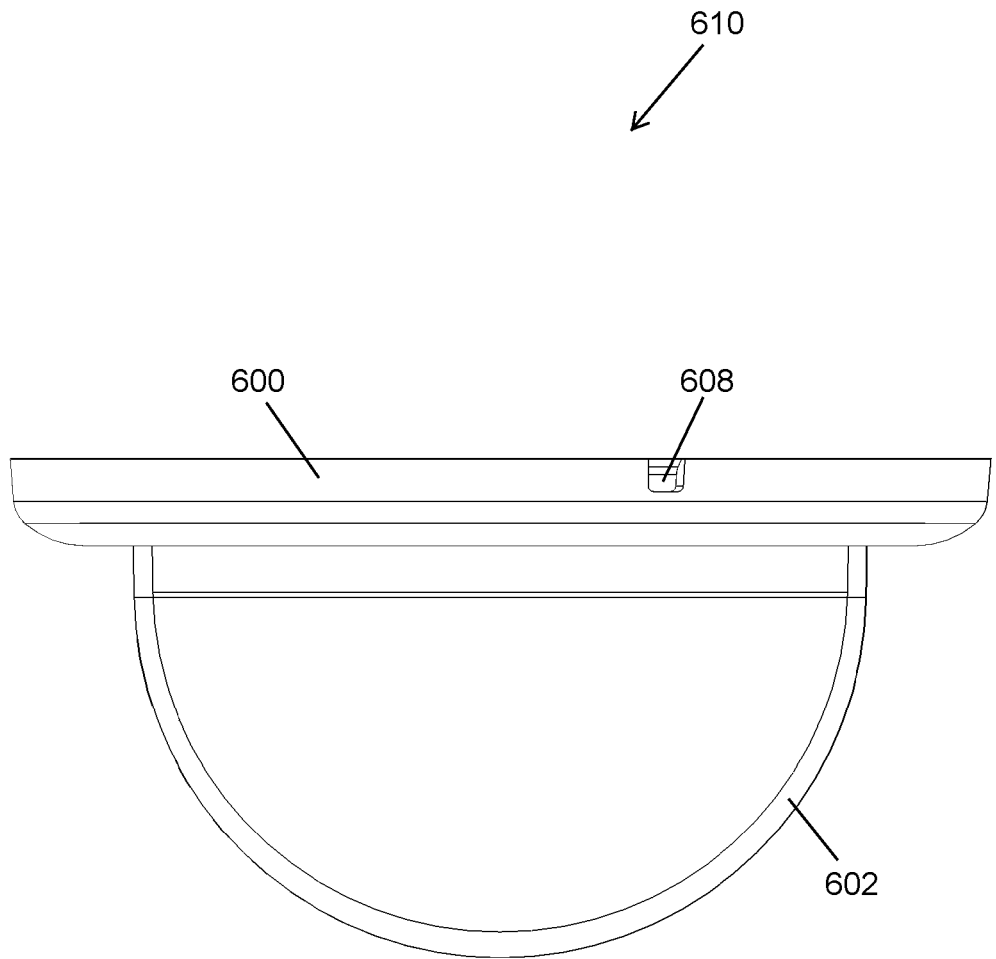
Figure 6D:
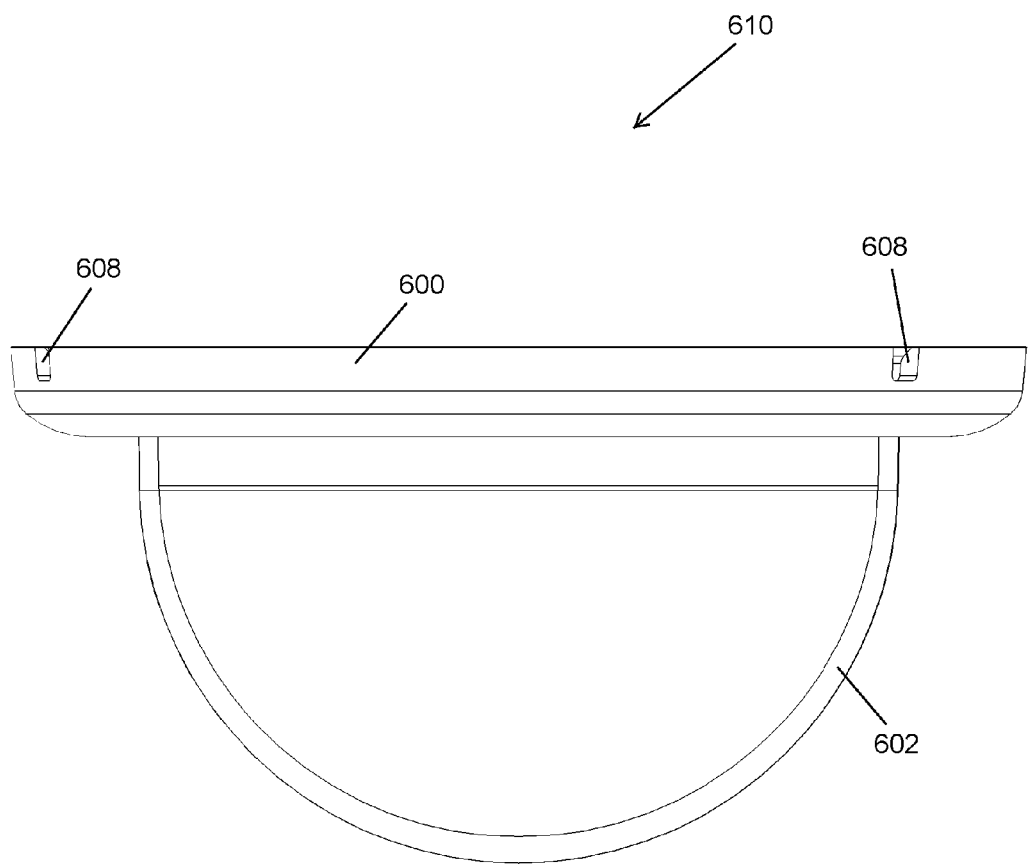
Figure 6E:
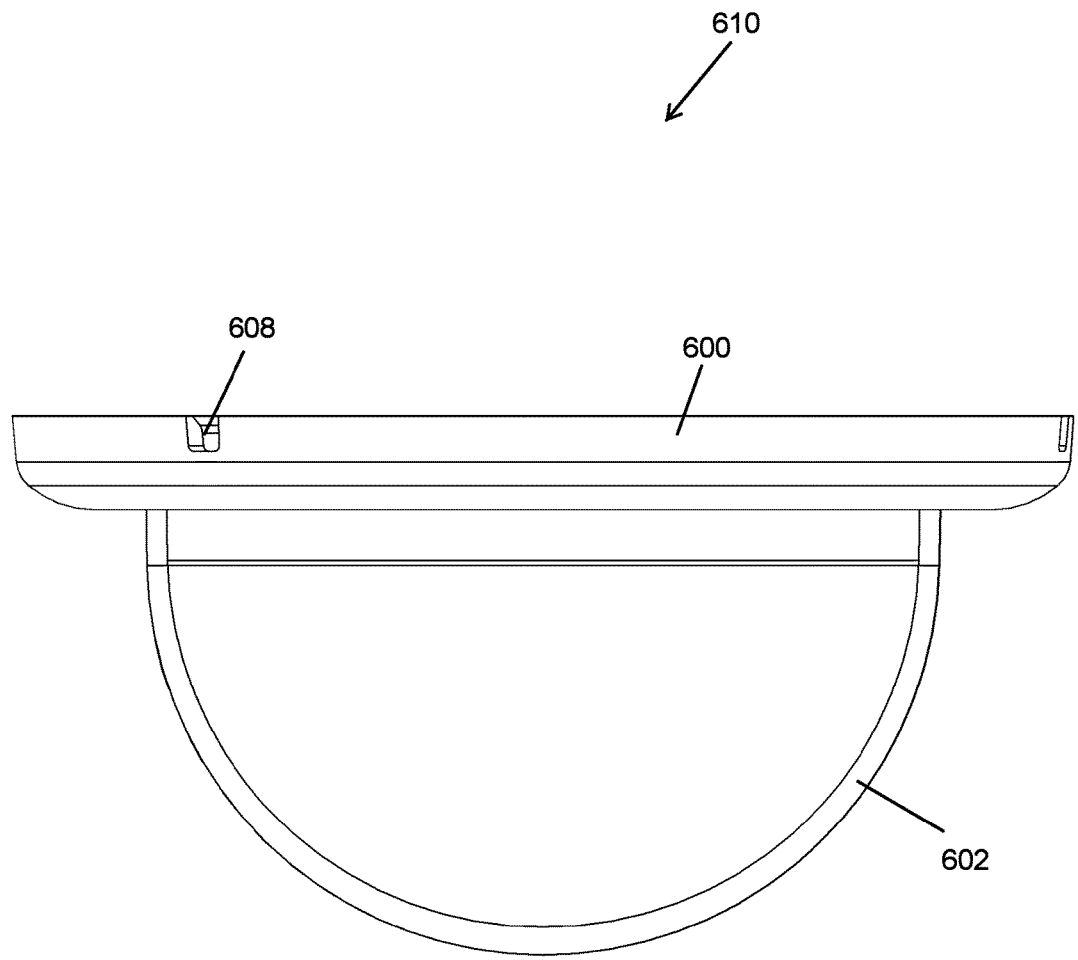
Figure 6F:
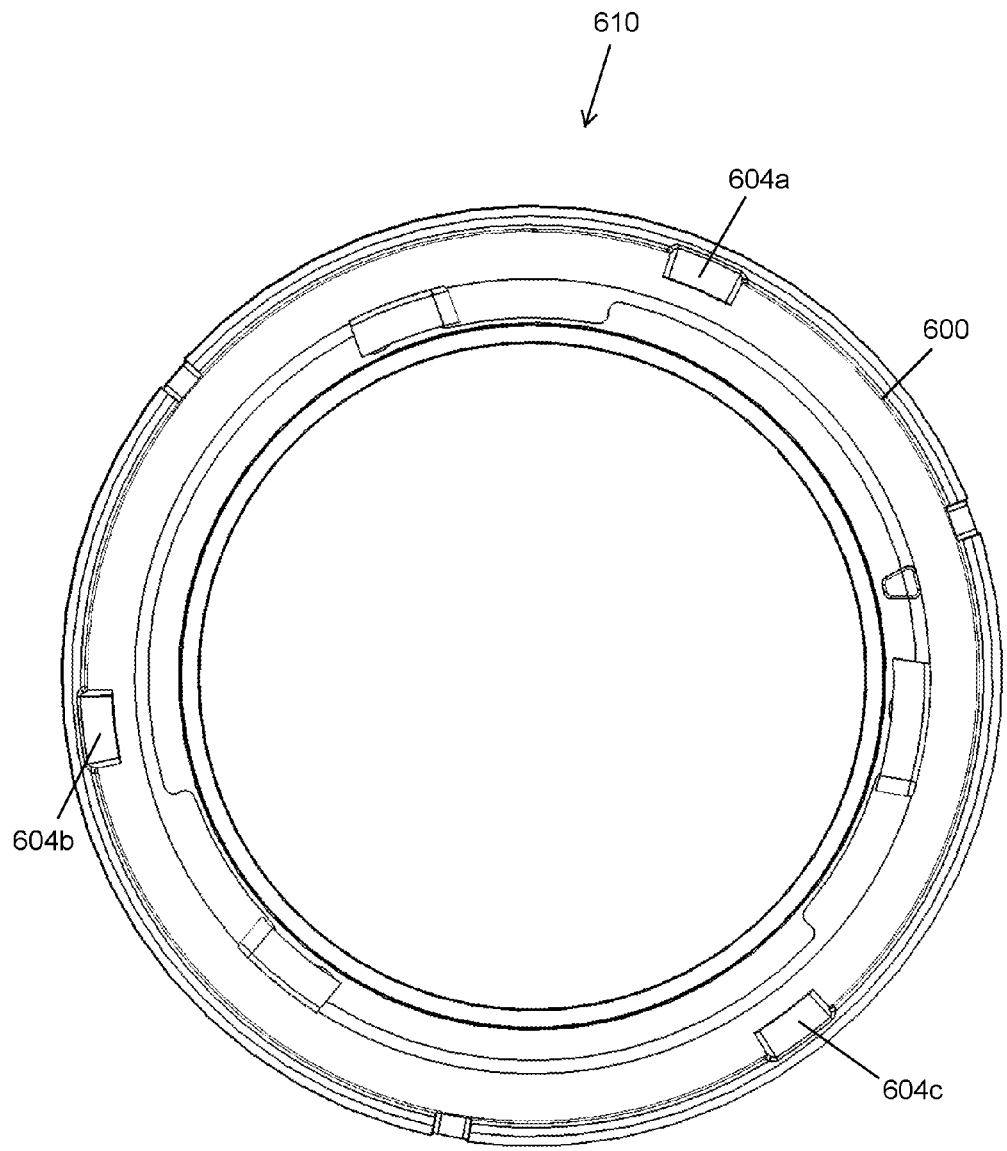
Figure 6G:
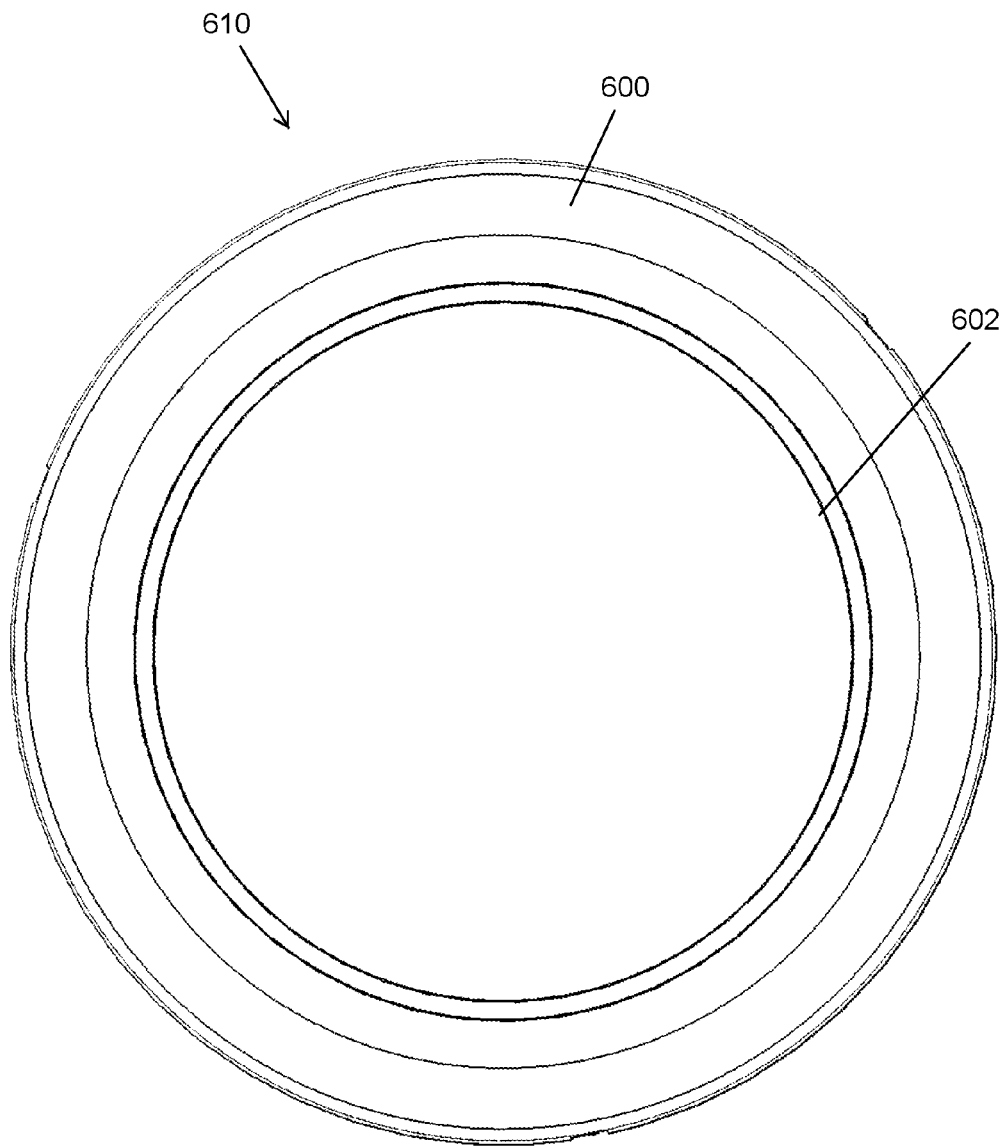
Figure 7:
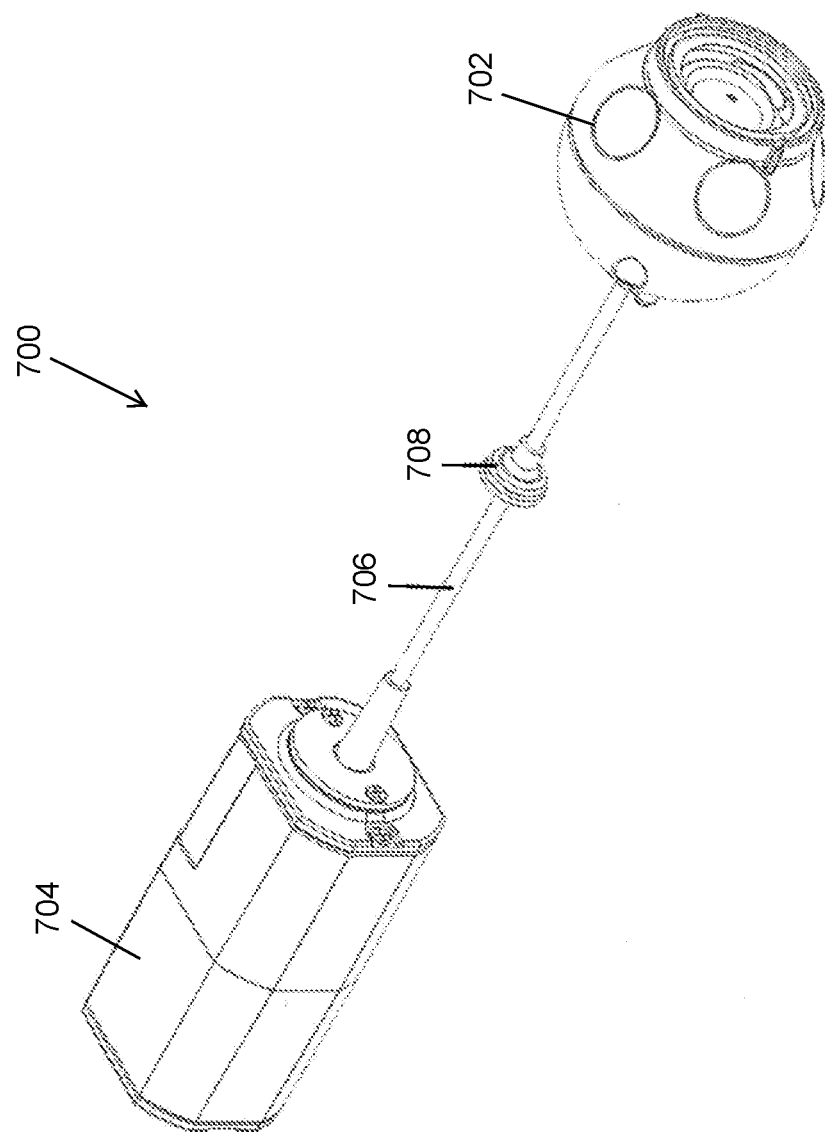
FIG. 7 shows a perspective view of the spherical camera of FIGS. 1A and 1B.

In the mounted position, the bottom of the sliding member 300 is substantially flush with the bottom of the surface contacting member's 400 flange 404, and the sliding member's 300 top surface 314 (visible in FIGS. 3A and 3F) abuts against the underside of the surface contacting member's 400 top surface 412 (visible in FIGS. 4A and 4F). The sliding member's channels 326 (visible in FIGS. 3A, 3B, and 3D) push the ends of the flat springs 422 that extend into the interior conduit 416, which pivots the flat springs 422 downwards. As discussed further in respect of FIG. 10F below, this biases the flat springs 422 against the ceiling and secures the mounting housing 102 in place.

Figure 9A:
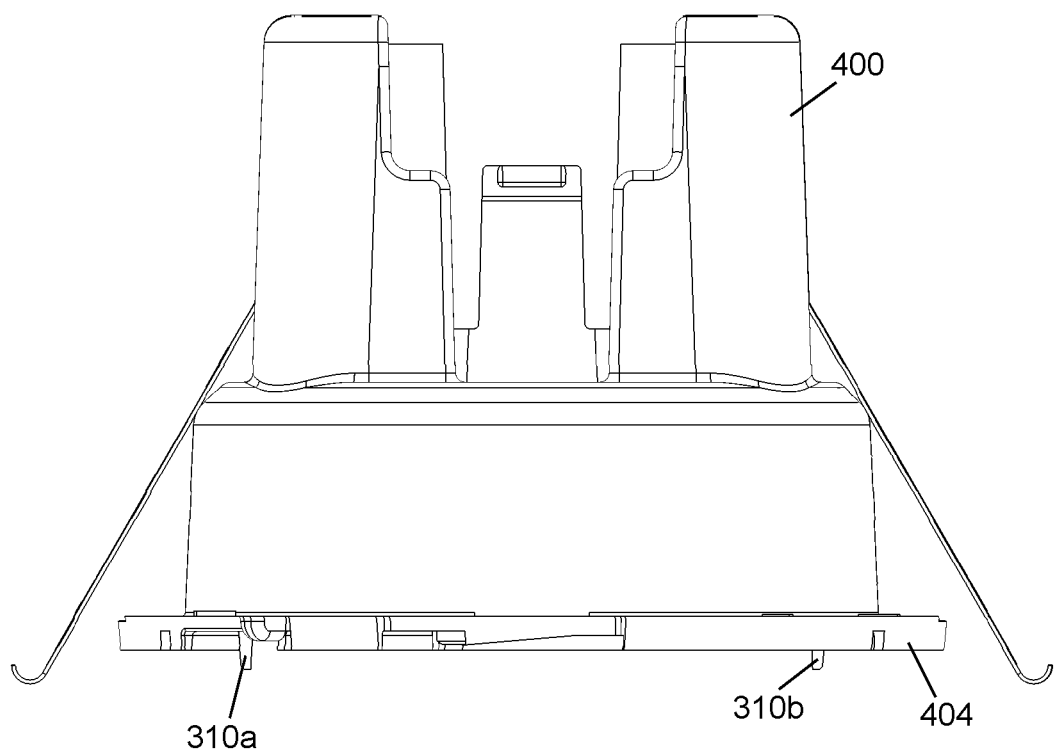
FIGS. 9A and 9B show front elevation views of a portion of the camera assembly of FIGS. 1A and 1B in the mounted and un-mounted positions, respectively.
Figure 9B:
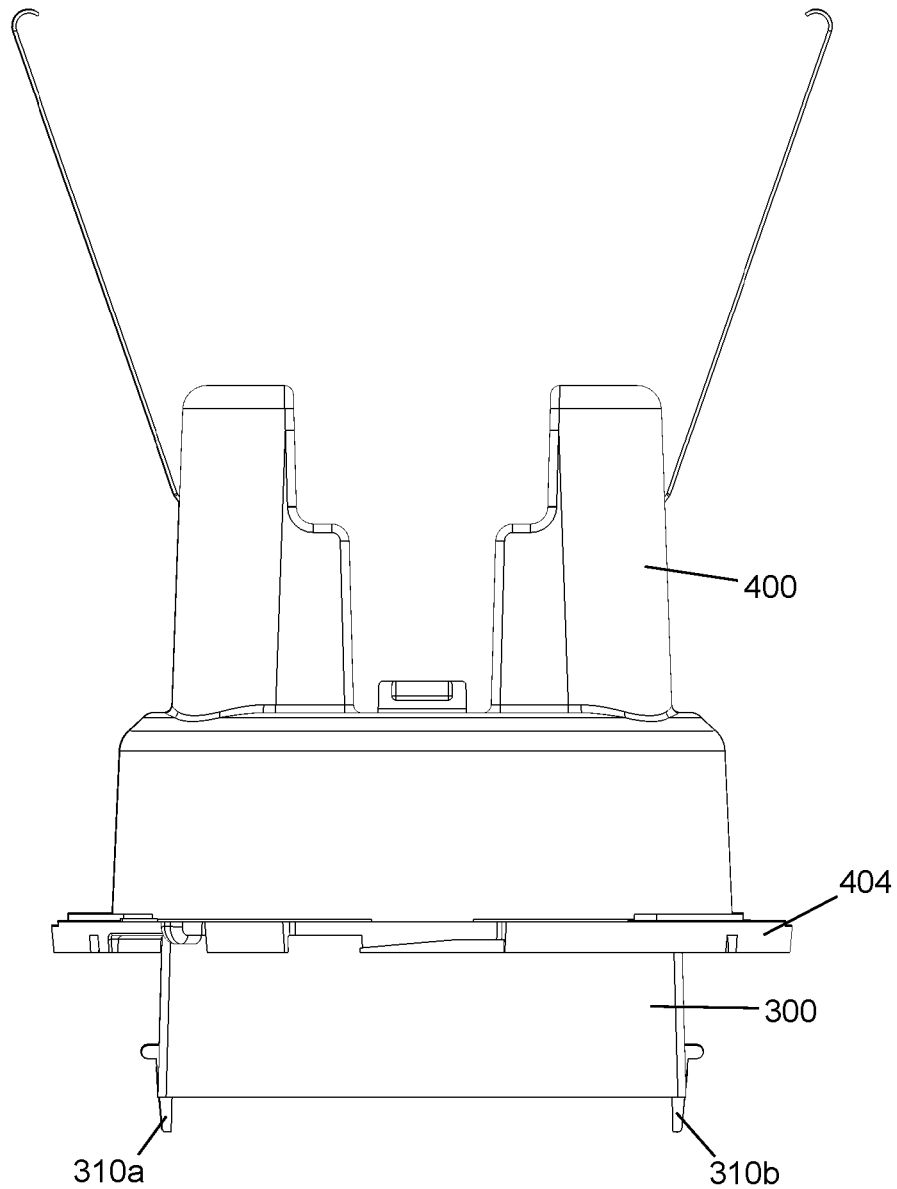
Figure 9C:
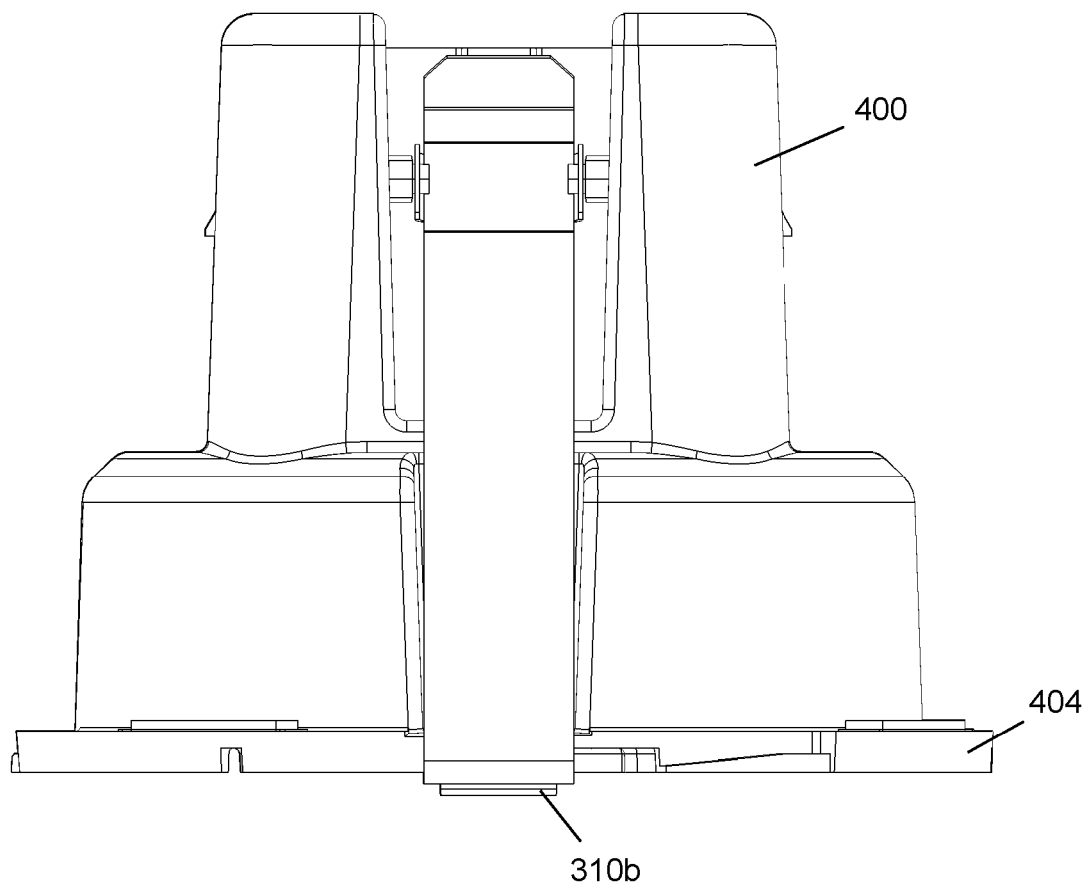
FIGS. 9C and 9D show right side elevation views of a portion of the camera assembly of FIGS. 1A and 1B in the mounted and un-mounted positions, respectively.
Figure 9D:
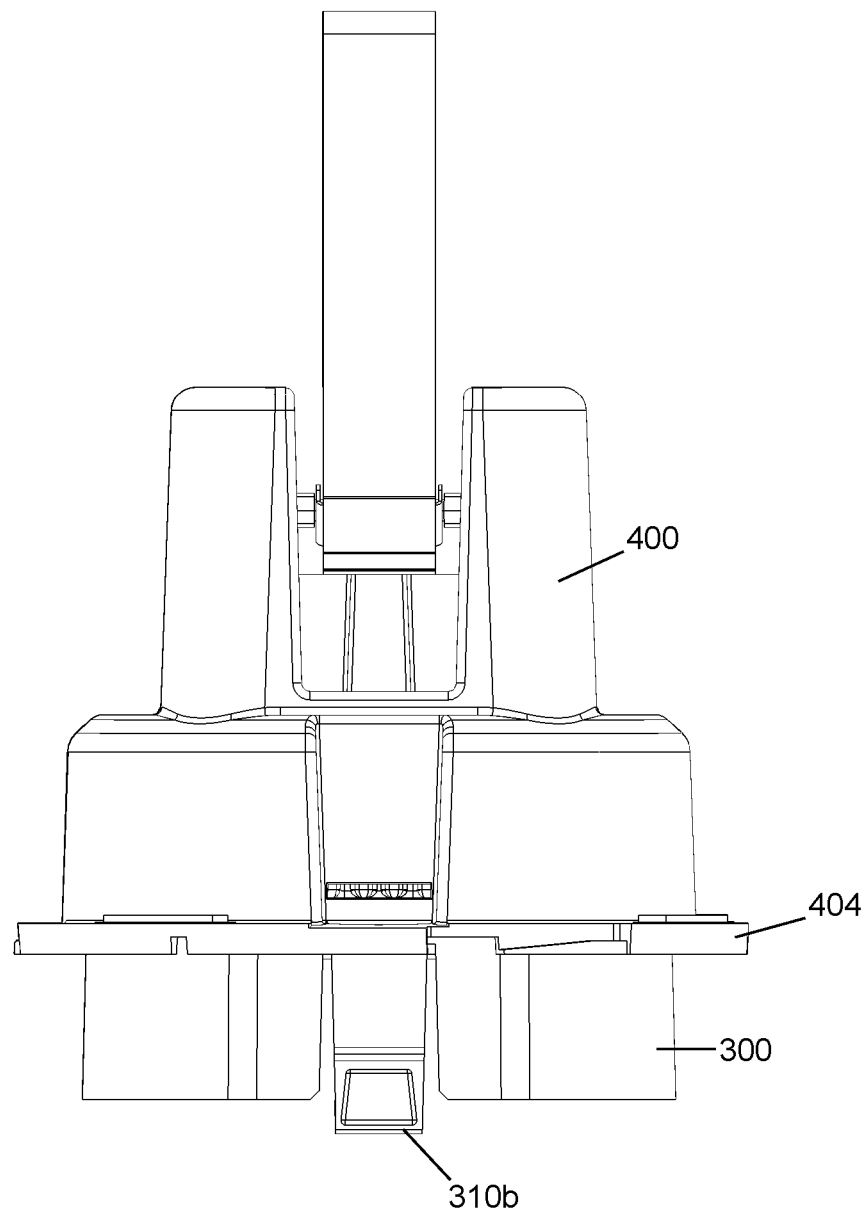

In the un-mounted position, the bottom of the sliding member 300 extends out from the bottom of the surface contacting member 400. This channels 326 in the sliding member's 300 top portion 318 are accordingly retracted away from the flat springs 422 and the flat springs 422 can be pivoted upwards, as shown in FIGS. 9B and 9D. As noted in FIG. 10E below, this can ease installation of the camera assembly 100.

Referring now to FIGS. 10A-10H, there is shown a method for mounting the camera 700 using the mounting housing 102, according to another embodiment. In FIG. 10A, the installer removes the shield 606 from the surface contacting member 400 by pressing the sides of the shield 606 inwards, which allows the installer to remove the shield from the clips 434. In FIG. 10A, the mounting housing 102 is shown with the sliding member 300 locked in the mounted position; that is, the hooks 312 on the flat sides 306 of sliding member 300 are inserted into the slots 420 in the surface contacting member 400. The sliding member 300 is constructed having a length such that when it is in the mounted position, the bottom of the sliding member 300 is, except for the lever arms 310, substantially flush with the bottom of the surface contacting member 400. In FIG. 10B, the installer squeezes the lever arms 310 and pulls the sliding member 300 partially out of the interior conduit 416, which permits the flat springs 422 to freely pivot throughout their range of motion as shown in FIG. 10C. In FIG. 10D, an RJ-45 plug 710 is connected to an Ethernet cable and a sheath 712 for a rear end of the camera's 700 processing module 704. In FIG. 10E, the installer connects the camera 700 to an Ethernet network by plugging the RJ-45 plug 710 into using an RJ-45 jack (not shown) on the back of the processing module 704 and inserts the back end of the mounting housing 102 into the ceiling space. With the mounting housing 102 being in the un-mounted position, the flat springs 422 can pivot upwards, which helps the installer insert the mounting housing 102 into the ceiling space. Once the mounting housing 102 has been inserted into the ceiling space, in FIG. 10F, the installer pushes the sliding member 300 up the interior conduit 416 until it locks in the mounted position by virtue of the hooks 312 on the flat sides 306 of sliding member 300 being re-inserted into the slots 420 in the surface contacting member 400. The channels 326 in the short sides 322 of the sliding member 300 press against the ends of the flat springs 422 that have pivoted into the interior conduit 416, which pivots the flat springs 422 downwards, biases the flat springs 422 against the back side of the ceiling A, and secures the camera assembly 100 into place. In FIG. 10F, the front end of the surface contacting member 400, which in the depicted embodiment is the flange 404, is pressed against a front side of the ceiling A while the sliding member 300 is being inserted up into the interior conduit 416. Once mounted, the ceiling A is clamped between the flat springs 422 and the flange 404. The installer may then adjust any one or more of the pitch, roll, and yaw of the camera head 702 in the gimbal 500. In FIG. 10G, the installer attaches the shield 606 back on to the flange 404, and in FIG. 10H the installer screws the trim ring 600 and dome 602 to the flange, which completes installation.

Although not shown in FIGS. 10A-10H, the installer may also manually mount the camera head 702 to the gimbal 500, and then mount the gimbal 500 on to the sliding member 300. To do this, the installer pushes the camera head 702 between the arms 504, which subsequently frictionally retain the camera head 702 while pushing it against the seat's 502 curved surface. The installer then takes the cable 706 coming out the back of the camera head 702 and pushes the nub 708 into the cable slot 516, securing it in place. The installer subsequently pushes the gimbal 500 against the underside of the sliding member 300 thereby locking it to the sliding member 300 using the gimbal latches 332, as described above in respect of FIG. 8.

While one example embodiment has been depicted, alternative embodiments (not depicted) are possible. For example, the top portions 318,414 of the sliding and surface contacting members 300,400 are both rounded rectangles in the depicted embodiments; however, in alternative embodiments, they may have a cross-section that is any type of polygon (with rounded corners or not), or have a non-polygonal cross-section. Similarly, in alternative embodiments the mounting housing 102 may be modified to mount a camera that differs from the camera 700 of FIG. 7. For example an alternative camera may integrate all circuitry into a single housing, as opposed to splitting it in the camera head 702 and processing module 704 as is done in the camera 700. When modified for a camera with all circuitry within a single housing, the opening 316 in the bottom portion 302 of the sliding member 300 may be eliminated as the installation method would not involve passing the processing module 704 through the interior conduit 416. As another example of an alternative type of camera, a camera that is non-spherical in shape, including a camera that has a non-spherical camera head, may be used.

In other alternative embodiments, springs other than the flat springs 422 may be used; for example, a coil or torsional spring may be used in place of the flat springs 422. Whatever spring is used may be manufactured in any suitable way; for example, the flat springs 422 may be manufactured from sheet metal or other suitable materials. Furthermore, the springs that are used need not directly contact the top of the ceiling. The springs may, for example, be used to bias some type of force application member, which in turn applies force to the ceiling. Furthermore, while in the depicted embodiment there are two flat springs 422, in alternative embodiments (not shown) there more be more than two flat springs 422, as desired.

As mentioned above, while the depicted embodiment of the mounting housing 102 is used to mount the spherical camera 700 to the ceiling A, in alternative embodiments (not depicted) the mounting housing 102 may be used to mount a camera (including a non-spherical camera) to any suitable planar surface behind which is sufficient volume to accommodate the back end of the mounting housing 102, the back end of the camera, and any associated wiring. For example, the mounting housing 102 may be used to mount the camera to a vertically extending wall, a horizontal floor, or a planar surface extending at any angle relative to the horizontal.

It is contemplated that any part of any aspect or embodiment discussed in this specification can be implemented or combined with any part of any other aspect or embodiment discussed in this specification.

FIGS. 10A-10H illustrate performance of an example method for installing a camera assembly. Some of the actions illustrated in FIGS. 10A-10H may be performed in an order other than that which is shown. Also, it should be appreciated that not all of the actions shown in FIGS. 10A-10H are required to be performed, that additional actions may be added, and that some of the illustrated actions may be substituted with other actions.

While particular embodiments have been described in the foregoing, it is to be understood that other embodiments are possible and are intended to be included herein. It will be clear to any person skilled in the art that modifications of and adjustments to the foregoing embodiments, not shown, are possible.

What is claimed:

1. A mounting housing for mounting through a hole on a mounting surface and for retaining a camera, the mounting housing comprising:
   a surface contacting member, comprising:
      a back end located substantially behind the mounting surface when the mounting housing is mounted through the hole, wherein the back end comprises a interior conduit extending along the back end;
      a front end connected to the back end and located substantially in front of the mounting surface when the mounting housing is mounted through the hole; and
      a first spring pivotably coupled to and extending outwardly from the back end, the first spring pivotable to apply force on to the mounting surface when the mounting housing is mounted through the hole; and
   a sliding member slidable along the interior conduit between a mounted position and a un-mounted position wherein at least a portion of the sliding member extends out of the back end when in the un-mounted position, and when in the mounted position, the sliding member biases the spring to apply force onto the mounting surface to retain the mounting surface substantially between the back end and the front end.

2. The mounting housing of claim 1, further comprising a second spring pivotably coupled to and extending outwardly from the back end, the second spring pivotable to apply force on to the mounting surface when the mounting housing is mounted;

wherein the sliding member is slidable along the interior conduit between mounted and un-mounted positions and at least a portion of the sliding member extends out of the back end when in the un-mounted position, and when in the mounted position, the sliding member biases the second spring to apply force onto the mounting surface to retain the mounting housing substantially between the back end and the front end.

3. The mounting housing of claim 2, wherein
the interior conduit is delineated by a wall having a slot;
each of the first spring and the second spring comprises two ends; and
each of the first spring and the second spring, between its two ends, is pivotably coupled to the back end of the surface contacting member.

4. The mounting housing of claim 3, wherein each of the first spring and the second spring is a flat spring and the flat springs apply force on to the mounting surface by directly contacting the mounting surface.

5. The mounting housing of claim 1, further comprising a first latch for locking the sliding member in the mounted position, the first latch comprising:
a first lever arm and a first hook on one of the sliding member and surface contacting member; and
a first slot shaped and positioned to receive the first hook when the sliding member is in the mounted position, the first slot on the other of the sliding member and surface contacting member.

6. The mounting housing of claim 5, further comprising a second latch for preventing the sliding member from sliding further out of the interior conduit when in the un-mounted position, the second latch comprising:
a second lever arm and a second hook on one of the sliding member and surface contacting member; and
a second slot shaped and positioned to receive the second hook when the sliding member is in the un-mounted position, the second slot on the other of the sliding member and surface contacting member.

7. The mounting housing of claim 1, further comprising a gimbal mounted to an underside of the sliding member for retaining a camera head, the gimbal comprising:
at least two arms positioned to frictionally retain the camera head there between, wherein each of the arms has a linearly extending side positioned to contact the camera head; and
a seat positioned to receive a surface of the camera head.

8. The mounting housing of claim 7, wherein the gimbal further comprises a top surface from which the arms and the seat extend, and wherein the top surface comprises a slot for receiving a cable that connects the spherical camera to image processing circuitry.

9. The mounting housing of claim 8, wherein:
the gimbal further comprises a lip extending from the top surface on a side opposite from which the arms and the seat extend, the lip spaced from the periphery of the top surface to delineate a flange between the lip and the periphery of the top surface; and
the sliding member further comprises gimbal latches extending from an underside of the sliding member, each of the gimbal latches comprising a lever arm at an end of which is a hook, and wherein the gimbal latches are hooked over the flange of the gimbal to secure the gimbal to the sliding member.

10. The mounting housing of claim 1, wherein:
the back end of the surface contacting member comprises:
a cylindrical portion having a top surface; and
a rounded polygonal portion extending outwardly from the top surface of the cylindrical portion, the interior conduit extending through the top surface and along the interior thereof; and
the front end of the surface contacting member comprises a flange circumscribing a bottom edge of the cylindrical portion.

11. The mounting housing of claim 10, wherein the rounded polygonal portion is shaped as a rounded rectangle.

12. The mounting housing of claim 10, wherein the sliding member comprises:
a base portion having a top surface; and
a rounded polygonal portion extending outwardly from the top surface of the base portion and having channels in opposing sides thereof, wherein at least one of the channels biases the spring against the back side of the mounting surface when the sliding member is in the mounted position and the mounting housing is mounted.

13. The mounting housing of claim 12, wherein the rounded polygonal portion is shaped as a rounded rectangle.

14. The mounting housing of claim 13, wherein:
the rounded polygonal portions of the sliding member and the surface contacting member are hollow and large enough to permit a processing module of the camera to pass therethrough; and
the top surfaces of the base portion of the sliding member and the cylindrical portion of the surface contacting member each have an opening, permitting access to the interior conduit, large enough to permit the processing module to pass therethrough.

15. The mounting housing of claim 1, wherein the mounting surface is a ceiling.

16. A camera assembly for mounting through a hole on a mounting surface, comprising:
a camera comprising:
a camera head comprising at least one of each of a lens and image sensor,
a processing module comprising image processing circuitry and power circuitry, and
a cable connecting the camera head and the processing module; and
a mounting housing for the camera, the mounting housing comprising:
a surface contacting member comprising:
a back end comprising an interior conduit extending along the back end,
a front end connected to the back end, and
each of a first spring and a second spring pivotably coupled to and extending outwardly from the back end, the springs pivotable to apply force on to the mounting surface when the mounting housing is mounted,
a sliding member slidable along the interior conduit between mounted and un-mounted positions, the sliding member in the mounted position to bias the springs to apply force on to the mounting surface when the mounting housing is mounted, and
a gimbal mounted to the sliding member for retaining the camera head.

17. A method for mounting a camera assembly through a hole on a mounting surface, the camera assembly comprising a camera attached to a mounting housing, the method comprising:
prior to inserting a back end of the mounting housing through the mounting surface:

creating the hole into the mounting surface sized to accept the back end but not a front end of the mounting housing that is connected to the back end, wherein each of a first spring and a second spring is pivotably coupled to and extends outwardly from the back end, the springs pivotable to apply force on to a back side of the mounting surface when the mounting housing is mounted;

moving a sliding member that comprises part of the mounting housing to an un-mounted position, wherein moving the sliding member comprises sliding, along an interior conduit within the back end, at least a portion of the sliding member remaining out of the back end;

placing the back end of the mounting housing behind the mounting surface;

pressing the front end of the mounting housing against a front side of the mounting surface while the back end of the mounting housing is behind the mounting surface; and moving the sliding member into the mounted position by sliding the sliding member into the back end along the interior conduit, wherein the sliding member biases the springs to apply force against the mounting surface when in the mounted position.

* * * * *